(12) United States Patent
Chowdhury et al.

(10) Patent No.: US 12,528,257 B2
(45) Date of Patent: Jan. 20, 2026

(54) DEVICE, SYSTEM AND METHOD FOR TACKING LAYERS OF MATERIAL

(71) Applicant: The Boeing Company, Arlington, VA (US)

(72) Inventors: Nayeem Chowdhury, Melbourne (AU); Pei Li Ong, Melbourne (AU); Shaun McFetridge, Melbourne (AU)

(73) Assignee: The Boeing Company, Arlington, VA (US)

( * ) Notice: Subject to any disclaimer, the term of this patent is extended or adjusted under 35 U.S.C. 154(b) by 140 days.

(21) Appl. No.: 18/489,452

(22) Filed: Oct. 18, 2023

(65) Prior Publication Data

US 2025/0128478 A1 Apr. 24, 2025

(51) Int. Cl.
*B29C 65/00* (2006.01)
*B29C 65/18* (2006.01)

(52) U.S. Cl.
CPC ........ *B29C 66/91421* (2013.01); *B29C 65/18* (2013.01); *B29C 66/1122* (2013.01); *B29C 66/9221* (2013.01)

(58) Field of Classification Search
CPC . B29C 66/9221; B29C 66/1122; B29C 65/18; B29C 66/91421
See application file for complete search history.

(56) References Cited

U.S. PATENT DOCUMENTS

| | | | |
|---|---|---|---|
| 4,976,012 A | 12/1990 | McConnell | |
| 5,151,277 A | 9/1992 | Bernardon et al. | |
| 5,688,421 A * | 11/1997 | Walton | H05B 3/141 |
| | | | 219/241 |
| 5,881,923 A * | 3/1999 | Bokros | B05C 17/0053 |
| | | | 222/146.2 |
| 6,053,026 A | 4/2000 | Nardiello et al. | |
| 6,354,472 B1 * | 3/2002 | Bridges | B05C 17/00526 |
| | | | 222/391 |
| 6,830,712 B1 | 12/2004 | Roffman et al. | |
| 9,561,602 B2 | 2/2017 | Jones et al. | |
| 9,969,131 B2 | 5/2018 | Samak Sangari et al. | |
| 10,538,451 B2 | 1/2020 | Angel et al. | |
| 2003/0205334 A1 | 11/2003 | Sherrill et al. | |

(Continued)

FOREIGN PATENT DOCUMENTS

| | | |
|---|---|---|
| GB | 2467784 A | 8/2010 |
| JP | S58100696 A | 6/1983 |
| WO | 2020178387 A1 | 9/2020 |

OTHER PUBLICATIONS

Adapa A/S, Adaptive Moulds, "Double Curved Adaptive Moulds", User Manual, May 2021, pp. 1-24, Denmark.

(Continued)

*Primary Examiner* — Vishal I Patel
(74) *Attorney, Agent, or Firm* — Walters & Wasylyna LLC

(57) ABSTRACT

A tacking device for tacking together two overlapped or abutted layers of material includes a body portion having a first body portion end, one or more micro-heaters attached to the body portion at the first body portion end, and a switch in electrical communication with the one or more micro-heaters and configured to permit or prevent a flow of electric power to the one or more micro-heaters. A system and method for tacking together two overlapped or abutted layers of material are also provided.

42 Claims, 10 Drawing Sheets

(56) References Cited

U.S. PATENT DOCUMENTS

| | | | |
|---|---|---|---|
| 2008/0251975 A1 | 10/2008 | Gallagher et al. | |
| 2010/0043511 A1* | 2/2010 | Forsyth | |
| 2016/0345563 A1* | 12/2016 | Fenton | B29C 65/542 |
| 2020/0331214 A1 | 10/2020 | Vlavianos et al. | |
| 2020/0398459 A1 | 12/2020 | Lehmann Madsen et al. | |
| 2021/0016455 A1* | 1/2021 | Ferguson | B25J 15/0441 |
| 2023/0286229 A1 | 9/2023 | Chowdhury | |

OTHER PUBLICATIONS

Terekhov, I.V. et al., "Binders Used for Manufacturing of Composite Materials by Liquid Composite Molding", Polymers Journal, 2022, pp. 1-30, vol. 14, No. 87, MDPI, Switzerland.

Innovative Sensor Technology AG, "Micro Heaters", Switzerland, retrieved from https://www.ist-ag.com/en/micro-heaters.

Intellectual Property Office of the United Kingdom Combined Searcha and Examination Report, dated Aug. 7, 2023, regarding Application No. GB2302685.2, 8 pages.

\* cited by examiner

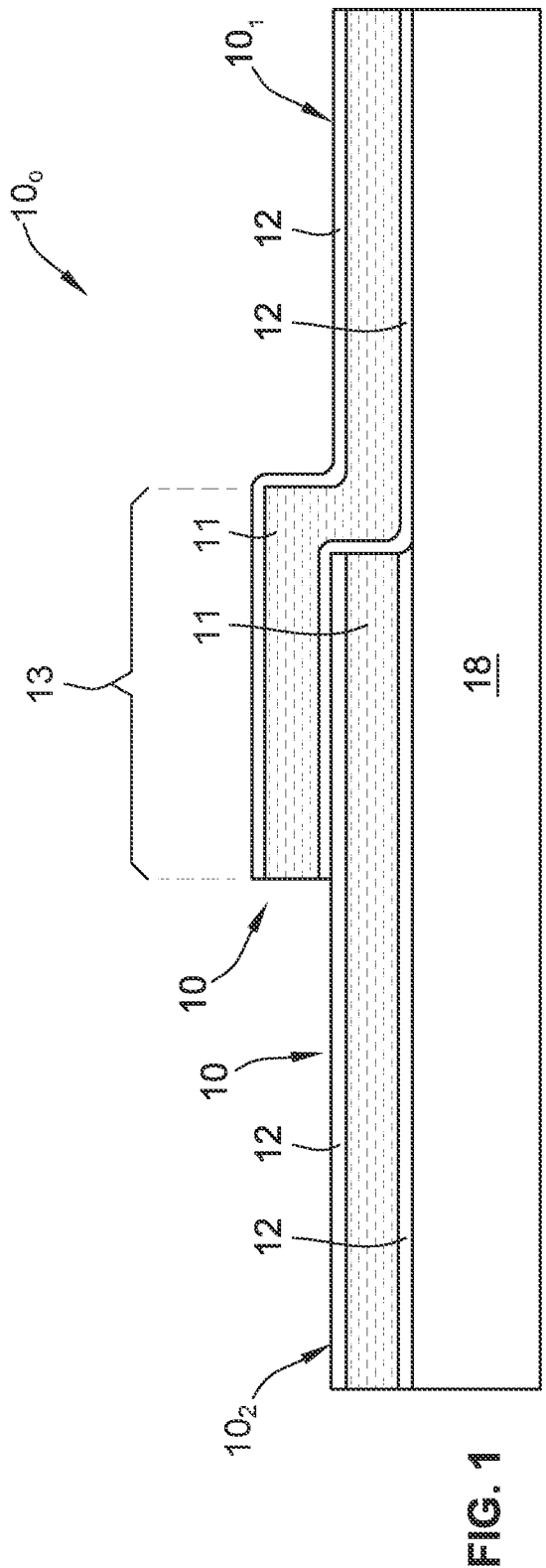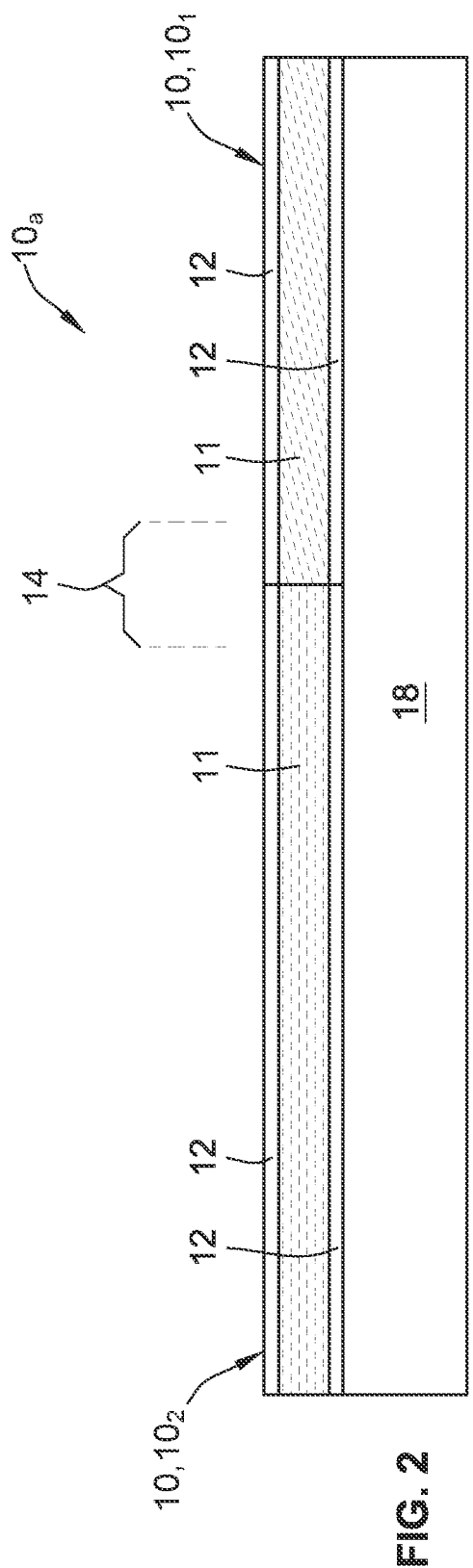

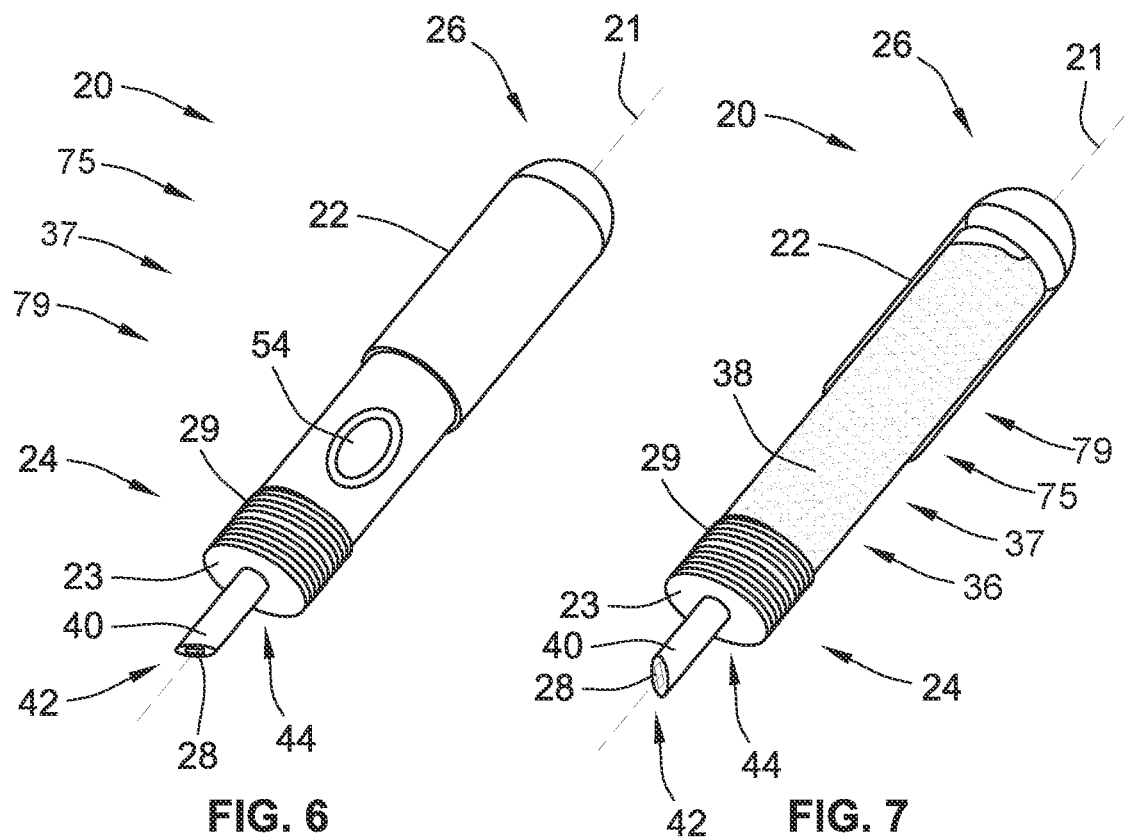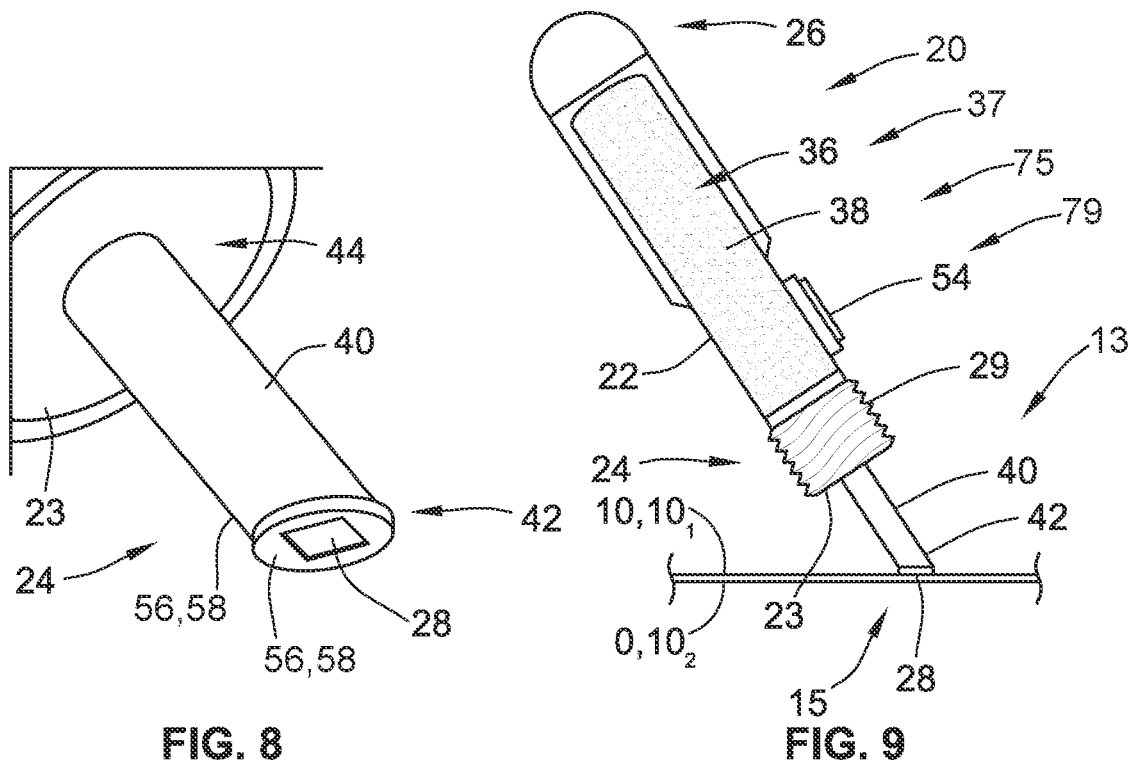

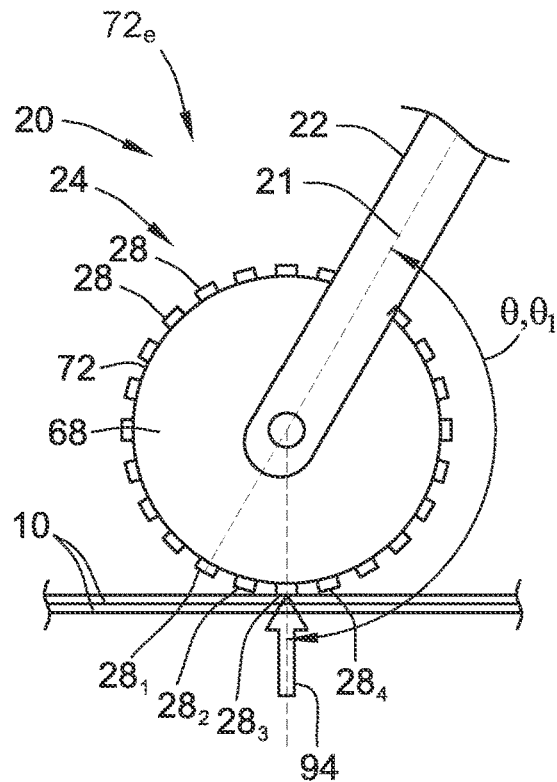
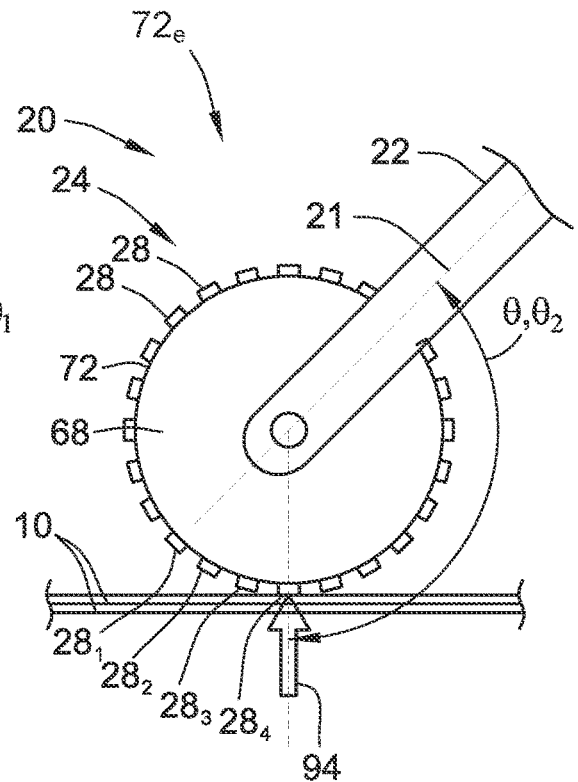
FIG. 16    FIG. 17
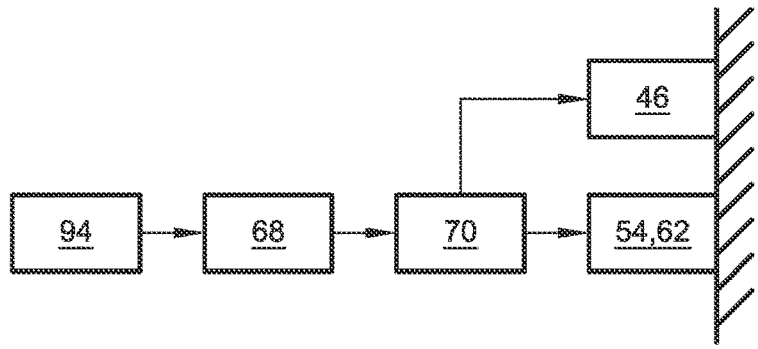
FIG. 18
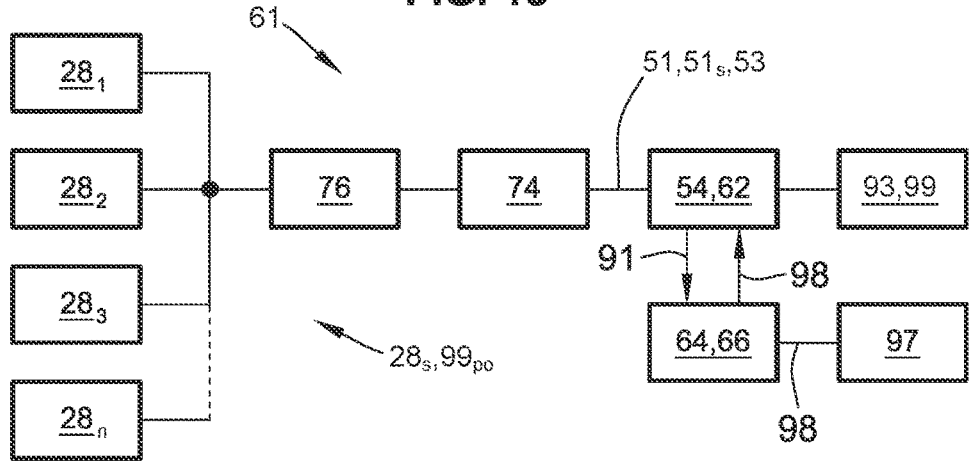
FIG. 19

DEVICE, SYSTEM AND METHOD FOR TACKING LAYERS OF MATERIAL

INTRODUCTION

This disclosure relates to devices, systems and methods for tacking together two or more layers of material.

Dry carbon fiber, pre-preg and other similar structural materials are typically provided in sheets. These sheets may be cut and arranged to form complex structural shapes, such as airfoils, fuselages and the like.

The cut sheets may be arranged such that their respective edges overlap or abut each other, thereby forming one or more overlapped or abutted areas. These areas may then be selectively heated, so as to attach the overlapped or abutted sheets together.

SUMMARY

According to one embodiment, a tacking device for tacking together two overlapped or abutted layers of material includes a body portion having a first body portion end, one or more micro-heaters attached to the body portion at the first body portion end, and a switch in electrical communication with the one or more micro-heaters and configured to permit or prevent a flow of electric power to the one or more micro-heaters.

The body portion may be configured to be hand-held and may have a generally tubular shape. The tacking device may also include a coating disposed on an exterior surface of the first body portion end, wherein the coating is configured for resisting a build-up of material thereon. Each of the one or more micro-heaters may have a power consumption of less than 5 Watts. The switch may be configured as a momentary switch, and optionally the switch may be configured to permit the flow of electric power to the one or more micro-heaters only when an external pressing force is being applied against the first body portion end.

The tacking device may be configured for being inductively charged and/or inductively powered by an inductive power source. The body portion may have an internal cavity and a battery disposed within the internal cavity, wherein the battery is in electrical communication with the one or more micro-heaters via the switch.

The tacking device may further include a first electrical lead providing electrical communication between the switch and the one or more micro-heaters, and a second electrical lead providing electrical communication between the switch and a two-pronged electrical connector that is disposed outside and separate from the body portion. In this arrangement, the switch may be attached to and/or captured within the body portion, wherein a first segment of the second electrical lead extends within the body portion and a second segment of the second electrical lead extends outside the body portion. Here, the second electrical lead may extend outside the body portion.

Alternatively, the switch may be disposed outside and separate from the body portion. In this configuration, a primary segment of the first electrical lead may extend within the body portion and a secondary segment of the first electrical lead may extend outside the body portion.

The first body portion end may include an elongate tip portion, wherein the elongate tip portion has a distal tip end and wherein the one or more micro-heaters is/are attached to the distal tip end. At least one of the body portion and the elongate tip portion may be made of a thermally insulative material.

The elongate tip portion may have a proximal tip end opposed to the distal tip end and disposed within the body portion, with the elongate tip portion being at least partially retractable into the body portion. In this arrangement, the tacking device may further include a biasing member captured within the body portion. The biasing member may have a first biasing member end attached to the elongate tip portion and a second biasing member end attached to an internal part of the body portion, wherein the biasing member cooperates with the elongate tip portion and the body portion such that the elongate tip portion is moveable between: (i) a fully extended position, in which no external pressing force is being applied against the distal tip end and the elongate tip portion extends to a maximum length out from the first body portion end; and (ii) a fully retracted position, in which an external pressing force is being applied against the distal tip end and the elongate tip portion extends to a minimum length out from the first body portion end.

The elongate tip portion may be continuously moveable between the fully extended position and the fully retracted position, thereby permitting a user holding the tacking device with the one or more micro-heaters against the two overlapped or abutted layers of material to control the external pressing force being applied against the one or more micro-heaters. The switch may be configured to permit or prevent the flow of electric power to the one or more micro-heaters by an external pressing force being applied against the distal tip end to thereby cause the elongate tip portion to actuate the switch. Additionally, the switch may be actuatable to permit or prevent the flow of electric power to the one or more micro-heaters when the elongate tip portion is moved to the fully retracted position by the external pressing force. Further, the switch may be configured to permit the flow of electric power to the one or more micro-heaters only when an external pressing force is being applied against the distal tip end.

The tacking device may also include an auto-shutoff circuit operatively connected with one or more of the switch, the biasing member, the elongate tip portion and the one or more micro-heaters, wherein the auto-shutoff circuit is configured to shut off the flow of electric power to the one or more micro-heaters when the one or more micro-heaters are powered on and no external pressing force has been applied against the distal tip end for more than a predetermined time-out period.

The tacking device may further include a device controller operatively connected with the switch and/or the one or more micro-heaters, wherein the device controller is configured for selectively permitting the flow of electric power to selected ones of the micro-heaters. The tacking device may additionally include an interface operatively connected with the switch and/or the one or more micro-heaters, wherein the interface is configured for receiving commands from an external controller for selectively permitting the flow of electric power to selected ones of the micro-heaters.

The body portion may include a roller having a hub that is rotatably attached to the first body portion end, wherein the one or more micro-heaters are attached about an outer perimeter of the roller. In this configuration, the tacking device may further include a first electrical distribution member disposed on the body portion at the first body portion end and a second electrical distribution member disposed on the roller about the hub, wherein the first electrical distribution member is in electrical communication with the switch and the second electrical distribution member is in electrical communication with the one or more micro-heaters, and wherein the first and second electrical distribution members are configured to maintain electrical communication with each other while the roller is rolled about the hub. The one or more micro-heaters may be evenly spaced around an entirety of the outer perimeter, and the first electrical distribution member may include a first slip ring member and the second electrical distribution member may include a second slip ring member in electrical communication with the first slip ring member.

The tacking device may further include a device controller operatively connected with one or more of the switch, the first electrical distribution member, the second electrical distribution member and the one or more micro-heaters, wherein the device controller is configured for selectively permitting the flow of electric power to selected ones of the micro-heaters. The tacking device may also include an interface operatively connected with one or more of the switch, the first electrical distribution member, the second electrical distribution member and the one or more micro-heaters, wherein the interface is configured for receiving commands from an external controller for selectively permitting the flow of electric power to selected ones of the micro-heaters. Additionally, the switch may be configured to permit the flow of electric power to the one or more micro-heaters only when an external pressing force is being applied against the roller.

In any of the foregoing configurations of the tacking device, the material may have a fiber core covered by at least one veil, wherein the fiber core is made of at least one of carbon, polymer, glass, metal and ceramic, and wherein the at least one veil is made of a thermoplastic material or a thermoset material.

According to another embodiment, a method for tacking together two layers of material includes: (i) overlapping or abutting the two layers of material, thereby providing an overlapped or abutted area; (ii) applying electric power to a tacking device, wherein the tacking device has a body portion with a first body portion end and one or more micro-heaters attached to the body portion at the first body portion end, wherein the applied electric power causes the one or more micro-heaters to heat up, thereby providing one or more heated-up micro-heaters; and (iii) pressing the tacking device against the overlapped or abutted area with the one or more heated-up micro-heaters pressed against one or more selected portions of the overlapped or abutted area, thereby producing one or more corresponding tacked portions of the overlapped or abutted layers.

The method may also include actuating a switch that is in electrical communication with the one or more micro-heaters, thereby permitting or preventing a flow of the electric power to the one or more micro-heaters. The method may further include automatically shutting off the flow of the electric power to the one or more micro-heaters when the one or more micro-heaters are powered on and no external pressing force has been applied against the one or more micro-heaters for more than a predetermined time-out period.

In this method, each of the two layers of material may include a respective veil made of a thermoplastic material, and wherein the pressing of the one or more heated-up micro-heaters against the one or more selected portions of the overlapped or abutted area causes the respective veils to melt and fuse together at the one or more selected portions so as to produce the one or more corresponding tacked portions thereat. Additionally or alternatively, each of the two layers of material may include a respective veil made of a thermoset material, and wherein the pressing of the one or more heated-up micro-heaters against the one or more selected portions of the overlapped or abutted area causes the respective veils to activate and fuse together at the one or more selected portions so as to produce the one or more corresponding tacked portions thereat.

According to yet another embodiment, a method for tacking together two layers of material is provided, wherein each of the two layers has a respective veil made of a thermoplastic material or a thermoset material. The method includes overlapping or abutting the two layers of material, thereby providing an overlapped or abutted area, and using one or more micro-heaters to melt or activate the respective veils at the overlapped or abutted area so as to tack the two layers together.

According to a further embodiment, a system for tacking together two layers of material includes: (i) a tacking device having a body portion with a first body portion end, one or more micro-heaters attached to the body portion at the first body portion end, and a switch in electrical communication with the one or more micro-heaters and configured to permit or prevent a flow of electric power to the one or more micro-heaters; (ii) a power source for supplying the electric power to the tacking device to heat up the one or more micro-heaters, thereby providing one or more heated-up micro-heaters; and (iii) a work space on which the two layers of material may be overlapped or abutted with each other and tacked together by pressing the one or more heated-up micro-heaters against the two overlapped or abutted layers.

The system may further include an end effector configured for attachment to and movement of the tacking device, wherein the end effector may be a robotic end effector.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 1 is a schematic side view of two partially overlapped layers of material.

FIG. 2 is a schematic side view of two abutted layers of material.

FIG. 6 is a perspective side view of a tacking device configured as a "tacking wand".

FIG. 7 is a partially sectional perspective side view of the tacking device of FIG. 6.

FIG. 8 is a close-up perspective side view of the first body portion end of the tacking device of FIGS. 6-7.

FIG. 9 is a partially sectional side view of the tacking device of FIGS. 6-8.

FIGS. 16-17 are schematic side views of a "pizza cutter" tacking device being used at two different angles.

FIGS. 18-19 are block diagrams of mechanical and electrical interactions, respectively, among elements of a "pizza cutter" tacking device.

DETAILED DESCRIPTION

Figure 3:
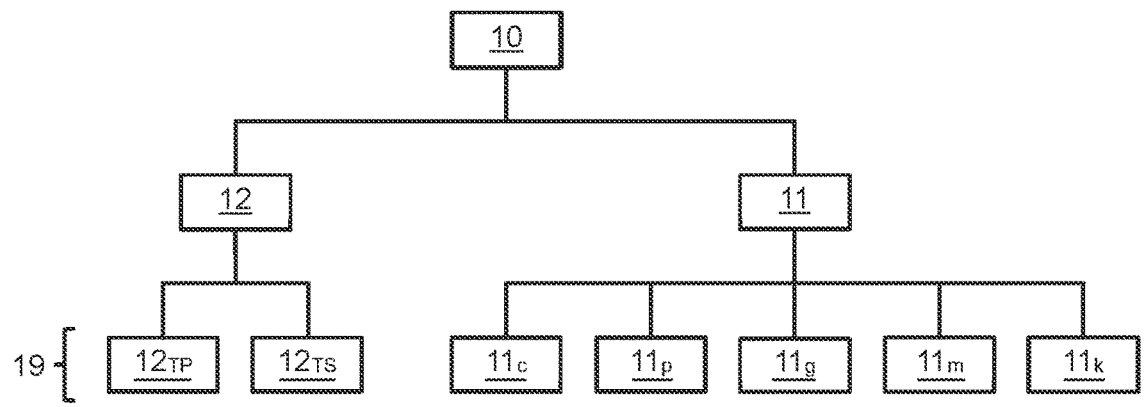
FIG. 3 is a block diagram showing various components and types of material.

Referring now to the drawings, wherein like numerals indicate like parts in the several views, a tacking device 20, a system 200 and a method 100 for tacking together 31 two layers 10 of material 19 are shown and described herein. FIGS. 1-2 show schematic side views of two layers 10 of material 19—namely, two partially overlapped layers $10_o$ and two abutted layers $10_a$, respectively—where the material 19 may be dry carbon fiber fabric, pre-preg, etc. Here, each layer 10 is made of a respective fiber core 11 sandwiched between two respective veils 12 or sheaths which, as illustrated in FIG. 3, may be made of a thermoplastic material $12_{TP}$ or a thermoset material $12_{TS}$. More specifically, the layers 10 as shown in FIG. 1 include a first layer $10_1$ and a second layer $10_2$, where a portion of the first layer $10_1$ overlaps onto a portion of the second layer $10_2$, thereby forming an overlapped area 13, with the overlapped area 13 and the first and second layers $10_1$, $10_2$ resting on a work area 18. In the overlapped arrangement shown in FIG. 1, the first and second layers $10_1$, $10_2$ may be viewed as overlapped layers 100. Alternatively, instead of the first and second layers $10_1$, $10_2$ being overlapped with each other, they may abut each other as illustrated in FIG. 2, with an edge of the first layer $10_1$ abutted against an edge of the second layer $10_2$, thereby forming an abutted area 14. In the abutted arrangement shown in FIG. 2, the first and second layers $10_1$, $10_2$ may be viewed as abutted layers $10_a$.

Figure 4:
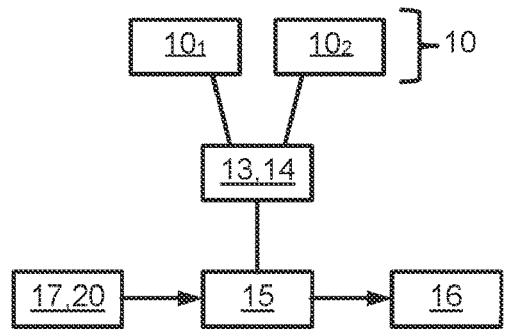
FIG. 4 is a flow diagram showing the use of a heated tool or tacking device to tack together selected portions of an overlapped or abutted area.

In either case, and according to a conventional approach, the first and second layers $10_1$, $10_2$ may be picked up and moved into position on the work area 18 by using one or more electrostatic pads (not shown). Then, as illustrated in the flow diagram of FIG. 4, a heated tool 17 may be pressed against one or more selected portions 15 of the overlapped or abutted areas 13, 14, such that if the veils 12 are made of a thermoplastic material $12_{TP}$, then the first and second layers $10_1$, $10_2$ are at least partially melted by the heated tool 17 at the one or more selected portions 15 and then allowed to cool; alternatively, if the veils 12 are made of a thermoset material $12_{TS}$, then the first and second layers $10_1$, $10_2$ are at least partially activated by the heated tool 17 (e.g., chemically and/or thermally) at the one or more selected portions 15 and then allowed to cure, thereby locally tacking and joining the first and second layers $10_1$, $10_2$ together at the one or more selected portions 15 of the overlapped or abutted areas 13, 14, so as to produce one or more corresponding tacked portions 16 at the one or more selected portions 15.

However, this conventional approach can suffer from various drawbacks and technical challenges. For example, the heated tool 17 may need to be repeatedly brought up to a desired temperature, placed against one of the selected portions 15 of the overlapped or abutted area 13, 14, left in place until the melting or curing occurs at the selected portion 15, picked up, and then moved to another of the selected portions 15, until finally all of the selected portions 15 have been melted or cured so as to produce the one or more corresponding tacked portions 16. This repetitive movement and placement of the heated tool 17 against the selected portions 15 may be fatiguing to human operators who are handling the heated tool 17. Additionally, in order to avoid having to repeatedly make the human operator wait until the heated tool 17 has been brought up to the desired temperature, the heated tool 17 may be left on for protracted periods of time—including periods when the heated tool 17 is not actually in use—thus incurring unnecessary additional energy cost for keeping the heated tool 17 heated.

In contrast with the abovementioned conventional approach, the tacking device 20, system 200 and method 100 for tacking together 31 two layers 10 of material 19 solve the abovementioned drawbacks and technical challenges by the technical effect of providing a tacking device 20 which utilizes one or more electrically powered micro-heaters 28 to provide heat, with the tacking device 20 optionally including a switch 54, an auto-shutoff circuit 62 and other features for minimizing the use of electric power 99 by the tacking device 20, thereby providing significant benefits and technical advantages which are not taught or suggested by the foregoing approaches. These benefits and technical advantages include reduced operator fatigue and increased operator satisfaction in using the tacking device 20, enhanced operator control of the tacking device 20, reduced overall energy cost due to the low current draw of the micro-heaters 28, increased productivity due to the very quick heat-up time of the micro-heaters 28, and further reduced overall energy cost due to the switch 54 and optional auto-shutoff circuit 62.

FIGS. 5-19 show various configurations of a tacking device 20 which may be used for tacking together 31 (e.g., welding, joining, fusing) two overlapped or abutted layers $10_o$, $10_a$ of material 19. The tacking device 20 includes a body portion 22 having a first body portion end 24, and in some configurations a second body portion end 26 that is opposed to the first body portion end 24. In some arrangements (e.g., see FIG. 5), the body portion 22 may also include a third body portion end 25 located between the opposed first and second body portion ends 24, 26. The tacking device 20 may be provided in a variety of different shapes and configurations, including various "hand-held" 37 configurations which may be easily gripped by a human operator; these include the "tacking gun" configuration shown in FIG. 5, the "tacking wand" configuration having a generally tubular shape 75 shown in FIGS. 6-13, and the "pizza cutter" configuration of FIGS. 14-19. Alternatively or additionally, the tacking device 20 may be configured for attachment 41 with an end effector 90, such as a robotic end effector $90_r$ of a robot 92. Each of these configurations is discussed in greater detail below.

As shown in the drawings, one or more micro-heaters 28 are attached 71 to the body portion 22 of the tacking device 20 at the first body portion end 24. Each of the one or micro-heaters 28 may be an electrically powered positive temperature coefficient (PTC) element which very quickly produces a relatively large amount of heat for its size. For example, each micro-heater 28 may be a relatively flat element that occupies an area of less than 1 cm² (or even as little as 2 mm$^2$), can produce several hundred degrees of heat, and has a power consumption 45 of less than 5 Watts C$_5$.

The tacking device 20 may include a coating 56 disposed on an exterior surface 58 of the first body portion end 24. This coating 56 may be configured for resisting 57$_r$ a build-up 57 of material 59 thereon, such as a build-up 57 of thermoplastic material 12$_{TP}$ if the two layers 10 have respective veils 12 made of thermoplastic material 12$_{TP}$, or a build-up 57 of thermoset material 12$_{TS}$ (including resin and/or curing agent) if the two layers 10 have respective veils 12 made of thermoset material 12$_{TS}$. Materials such as polytetrafluoroethylene (PTFE), ceramic, anodized aluminum, silicone, vitreous enamel, stainless steel or titanium may be used for the coating 56.

Figures 22, 23:
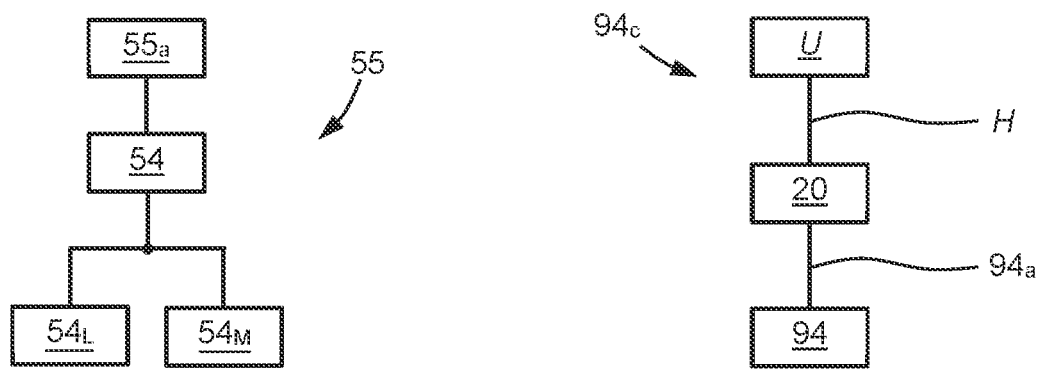
FIG. 22 is a block diagram of multiple types of switches.
FIG. 23 is a block diagram of a user holding a tacking device.

The tacking device 20 also includes a switch 54 that is in electrical communication 61 with the one or more micro-heaters 28. The switch 54 is configured to permit 51 a flow 99$_f$ of electric power 99 to the one or more micro-heaters 28 when the switch 54 is turned ON, and to prevent 53 the flow 99$_f$ of electric power 99 to the one or more micro-heaters 28 when the switch 54 is turned OFF. As illustrated in the block diagram of FIG. 22, the switch 54 may be a latching switch 54$_L$—which may be turned from a first state (e.g., OFF) to an opposite second state (e.g., ON) by an actuation 55$_a$ (e.g., a button push, a toggle throw), with the switch 54 remaining in the second state until a subsequent actuation 55$_a$ is performed—or, it may be a momentary switch 54$_M$, which is in a normally-OFF state, but which can be placed in the ON state by an actuation 55$_a$ which is sustained. For example, the momentary switch is ON only while an external pressing force 94 is maintained against the momentary switch 54$_M$, with the momentary switch 54$_M$ returning to the normally-OFF state when the external pressing force 94 is removed.

As shown in FIGS. 10-11 and 14-15, the tacking device 20 may further include a first electrical lead 30 for providing electrical communication 61 between the switch 54 and the one or more micro-heaters 28, and a second electrical lead 32 for providing electrical communication 61 between the switch 54 and an internal battery 38, an external electric power source 34, or a two-pronged electrical connector 39 that is disposed outside 63 and separate 65 from the body portion 22. (For example, the two-pronged electrical connector 39 may be a common household-type electrical plug which may be inserted into a wall electrical socket, and may optionally include a third prong acting as a ground connection.)

In some arrangements, the first electrical lead 30 may be divided into a primary segment 30$_1$ which extends within 67 the body portion 22, and a secondary segment 30$_2$ which extends outside 63 the body portion 22; similarly, the second electrical lead 32 may be divided into a first segment 32$_1$ which extends within 67 the body portion 22, and a second segment 32$_2$ which extends outside 63 the body portion 22. The determination of which of these segments are present may depend (at least in part) on the location of the switch 54 with respect to the body portion 22—that is, whether the switch 54 is disposed on 69 or within 67 the body portion 22, or is disposed outside 63 and separate 65 from the body portion 22.

Figure 10:
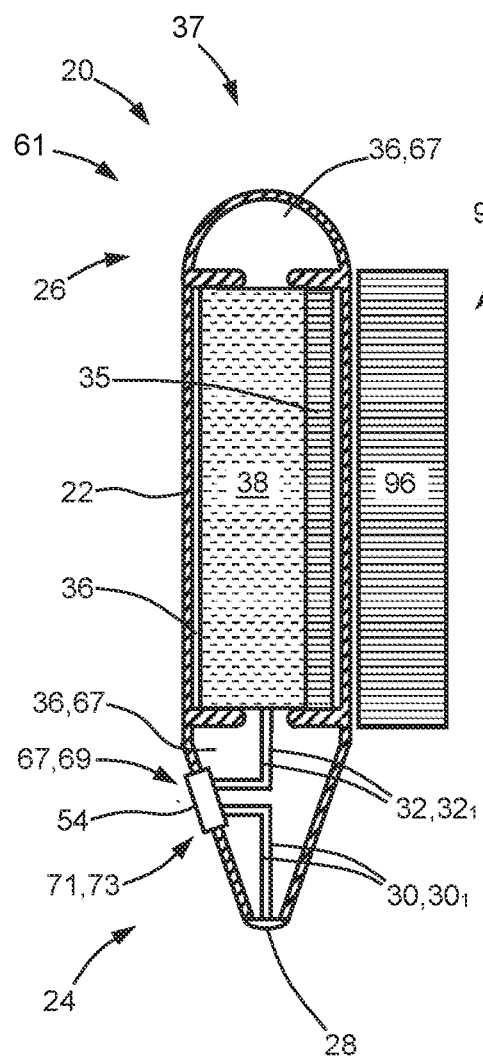
FIG. 10 is a schematic sectional side view of a tacking device powered by inductive coupling and/or by an internal battery.

For example, as illustrated in FIG. 10, the switch 54 may be attached 71 to and/or captured 73 within 67 the body portion 22. In this arrangement, a battery 38 may be housed within 67 an internal cavity 36 of the body portion 22, with the first electrical lead 30 running from the one or more micro-heaters 28 to the switch 54 entirely within 67 the internal cavity 36, thus making the entirety of the first electrical lead 30 a primary segment 30$_1$ as well. Similarly, the second electrical lead 32—which runs from the switch 54 to the battery 38—also lies entirely within 67 the internal cavity 36, thus making the entirety of the second electrical lead 32 a first segment 32$_1$. Optionally, the tacking device 20 may include an internal coil 35 or pickup within the body portion 22 which electrically communicates with the battery 38; such a configuration may be paired with an inductive power source 96 (e.g., a coil or electromagnetic field outside the tacking device 20) which is configured to inductively charge 96$_{ic}$ the battery 38 by inducing an electrical current in the internal coil 35 that is connected with the battery 38. Furthermore, in some configurations, the tacking device 20 may not include a battery 38, but may include the internal coil 35 (optionally along with other electronics) such that the tacking device 20 may be powered directly and inductively (i.e., inductively powered 96$_{ip}$) by the inductive power source 96.

Figure 11:
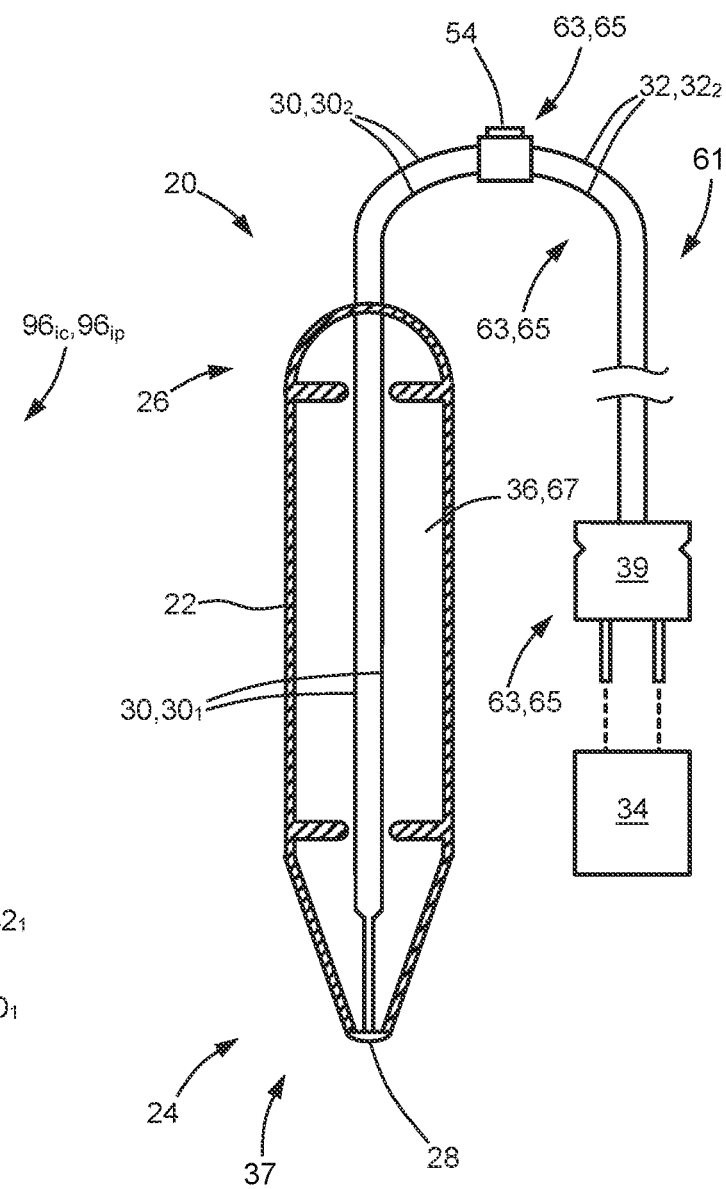
FIG. 11 is a schematic sectional side view of a tacking device powered by an external power source via one or more electrical leads.

Alternatively, as illustrated in FIG. 11, the switch 54 may be disposed outside 63 and separate 65 from the body portion 22. In this arrangement, a primary segment 30$_1$ of the first electrical lead 30 may extend within 67 the body portion 22 and a secondary segment 30$_2$ of the first electrical lead 30 may extend outside 63 the body portion 22 between the body portion 22 and the switch 54. Here, the entirety of the second electrical lead 32 lies outside 63 the body portion 22, thus also making the entire second electrical lead 32 a second segment 32$_2$. As shown in the drawing, the second electrical lead 32 may optionally terminate with a two-pronged electrical connector 39, which may engage with an external electric power source 34.

Comparing FIGS. 10 and 11, it may be seen that the tacking device 20 may be configured for inductive charging 96$_{ic}$, and/or for being inductively powered 96$_{ip}$, by an inductive power source 96 (see FIG. 10), or the tacking device 20 may be configured for being conductively (i.e., non-inductively) charged and/or powered (see FIG. 11). Additionally or alternatively, the tacking device 20 may combine selected features of the arrangements illustrated in FIGS. 10-11. For example, the tacking device 20 may include a configuration such as shown in FIG. 10, but without a battery 38 and internal coil 35, and with the second electrical lead 32 extending from the switch 54 to the outer wall of the body portion 22 (thus defining a first segment 32$_1$ of the second electrical lead 32 extending within 67 the body portion 22) and from the outer wall of the body portion 22 to a two-pronged electrical connector 39 (thus defining a second segment 32$_2$ of the second electrical lead 32 extending outside 63 the body portion 22). Other combinations of features among the configurations shown among FIGS. 5-19 are also possible.

As noted above, the tacking device 20 may assume various configurations, such as the aforementioned "tacking gun", "tacking wand" and "pizza cutter" configurations.

Figure 5:
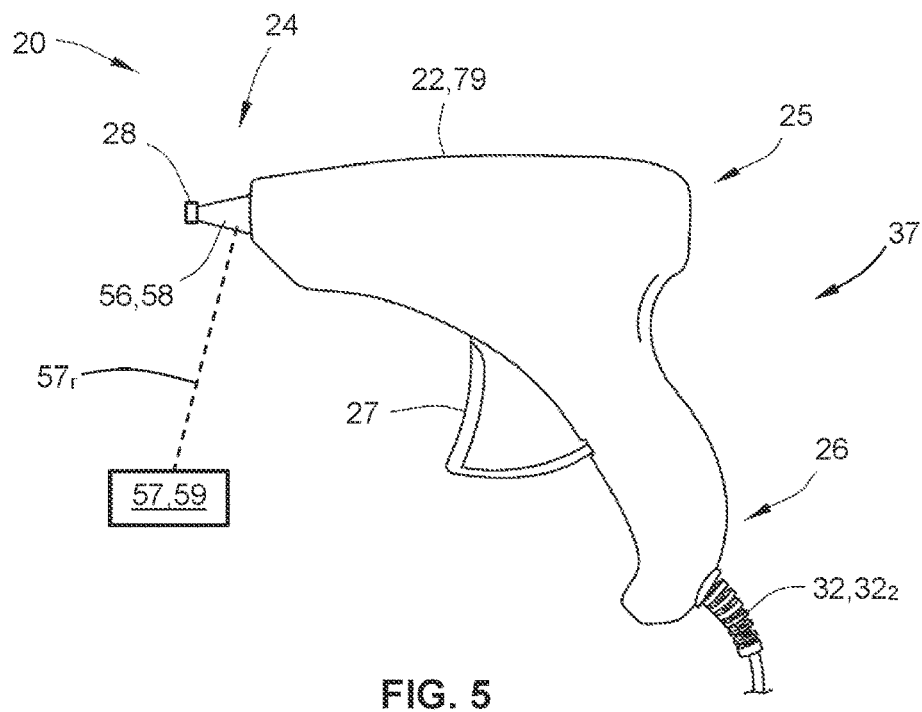
FIG. 5 is a side view of a tacking device configured as a "tacking gun".

FIG. 5 shows a "tacking gun" type of configuration for the tacking device 20. Here, a trigger 27 is included, which may be operatively connected with a switch 54 (not shown) inside the body portion 22. A user U may hold H or grasp the tacking device 20 in their hand (see also FIG. 23) and may squeeze the trigger 27 to close the switch 54, thereby causing electric power 99 to flow 99$_f$ along the second electrical lead 32 to the one or more micro-heaters 28. The configuration shown in FIG. 5 has a tapered or nozzle-shaped portion at the first body portion end 24, with a coating 56 applied thereon to prevent a build-up 57 of material 59. Note that while the second electrical lead 32 is shown entering the body portion 22 at the second body portion end 26, the second electrical lead 32 may alternatively enter at the third body portion end 25 or at other locations on the body portion 22. Alternatively, in some configurations, no second electrical lead 32 is provided, and the tacking device 20 may instead be powered by an internal battery 38 (not shown) and/or by an inductive power source 96 (also not shown).

FIGS. 6-13 show various renderings of a "tacking wand" type of configuration for the tacking device 20. This configuration may include a body portion 22 having a generally tubular shape 75 and a longitudinal axis 21 defining opposed first and second body portion ends 24, 26, with one or more micro-heaters 28 disposed on the first body portion end 24. The switch 54 may be disposed on 69 and/or within 67 the body portion 22, such as illustrated in FIGS. 6-10 and 12-13, or the switch 54 may be disposed outside 63 and separate 65 from the body portion 22, such as shown in FIG. 11. As illustrated in FIGS. 6-7 and 9, the tacking device 20 may optionally include cooling fins 29 at the first body portion end 24.

Turning to FIGS. 6-9 and 12-13 in particular, it may be seen that the first body portion end 24 may include an elongate tip portion 40. The elongate tip portion 40 may have a distal tip end 42 and a proximal tip end 44 opposed to the distal tip end 42, with the one or more micro-heaters 28 being attached 71 to the distal tip end 42. One or both of the body portion 22 and the elongate tip portion 40 may be made of a thermally insulative material 79.

The elongate tip portion 40 may be provided in either of two configurations.

In a first configuration, such as illustrated in FIGS. 6-9, the elongate tip portion 40 may be fixedly attached 71 with respect to the rest of the body portion 22. For example, the first body portion end 24 may have a face 23 whose surface runs perpendicular to the longitudinal axis 21 of the body portion 22, and the elongate tip portion 40 may extend from this face 23 with the proximal tip end 44 being located at the face 23 and with the distal tip end 42 extending outward from the face 23 along the longitudinal axis 21.

Figure 12:
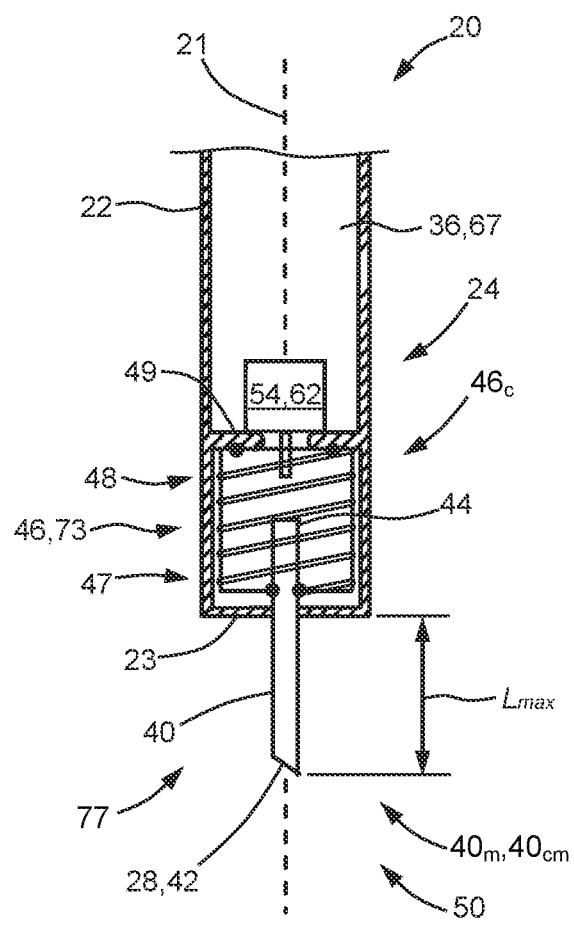
FIGS. 12-13 are schematic sectional side views of a tacking device in fully extended and fully retracted positions, respectively.
Figure 13:
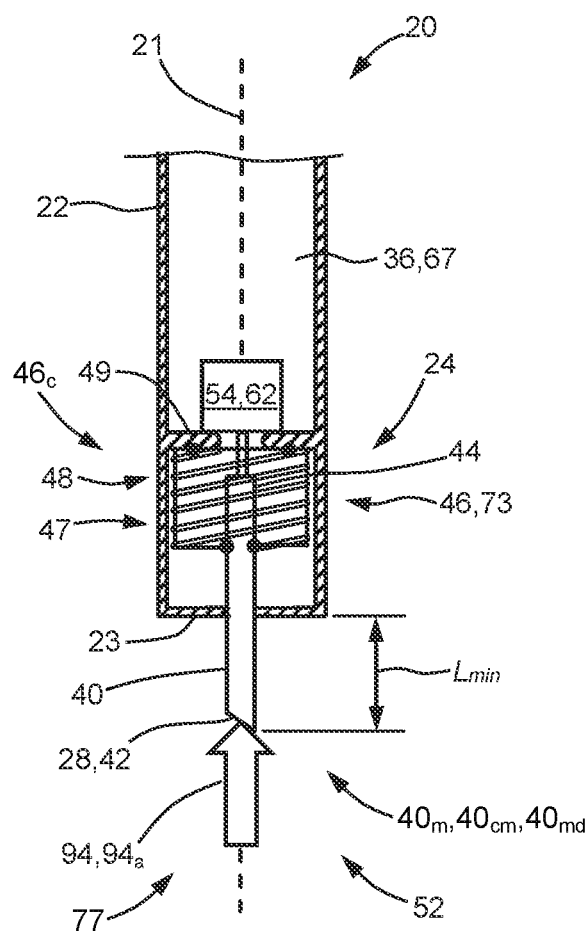

In a second configuration, such as illustrated in FIGS. 12-13, the elongate tip portion 40 is not fixed with respect to the rest of the body portion 22, but instead is moveable $40_m$ with respect to the rest of the body portion 22 along the longitudinal axis 21. As shown in the drawings, the distal tip end 42 may be disposed within 67 the body portion 22, with the elongate tip portion 40 being at least partially retractable 77 into the body portion 22 along the longitudinal axis 21. In this arrangement, the tacking device 20 may further include a biasing member 46 (e.g., a spring, a resilient/elastomeric member, etc.) captured 73 within 67 the body portion 22 at the first body portion end 24. The biasing member 46 may have a first biasing member end 47 attached 71 to the elongate tip portion 40 and a second biasing member end 48 attached 71 to an internal part 49 of the body portion 22. The internal part 49 may be a protuberance or other feature which extends inward from the body portion wall and into the internal cavity 36. Note in FIGS. 12-13 that two black circular dots are shown at the first biasing member end 47, representing points where the biasing member 46 is attached 71 to the elongate tip portion 40, and two other black circular dots are shown at the second biasing member end 48, representing points where the biasing member 46 is attached 71 to the internal part 49 of the body portion 22.

The biasing member 46 may cooperate $46_c$ and engage with the elongate tip portion 40 and the body portion 22 such that the elongate tip portion 40 is moveable $40_m$ between a fully extended position 50, as shown in FIG. 12, and a fully retracted position 52, as shown in FIG. 13. In the fully extended position 50, no external pressing force 94 is being applied $94_a$ against the distal tip end 42 (e.g., the tacking device 20 is not being pressed against any overlapping or abutted area 13, 14), and the elongate tip portion 40 extends to a maximum length $L_{max}$ out from the first body portion end 24 (e.g., out from the face 23) as measured along the longitudinal axis 21. On the other hand, in the fully retracted position 52, an external pressing force 94 is being applied $94_a$ against the distal tip end 42 (e.g., the tacking device 20 is being pressed against an overlapping or abutted area 13, 14), and the elongate tip portion 40 extends to a minimum length $L_{min}$ out from the first body portion end 24 (e.g., out from the face 23) as measured along the longitudinal axis 21. The elongate tip portion 40 may be continuously moveable $40_{cm}$ between the fully extended position 50 and the fully retracted position 52, thereby permitting a user U holding H the tacking device 20—with the one or more micro-heaters 28 held or pressed against the two overlapped or abutted layers $10_o$, $10_a$ of material 19—to control $94_c$ the external pressing force 94 being applied $94_a$ against the one or more micro-heaters 28 (see also FIG. 23).

Figure 14:
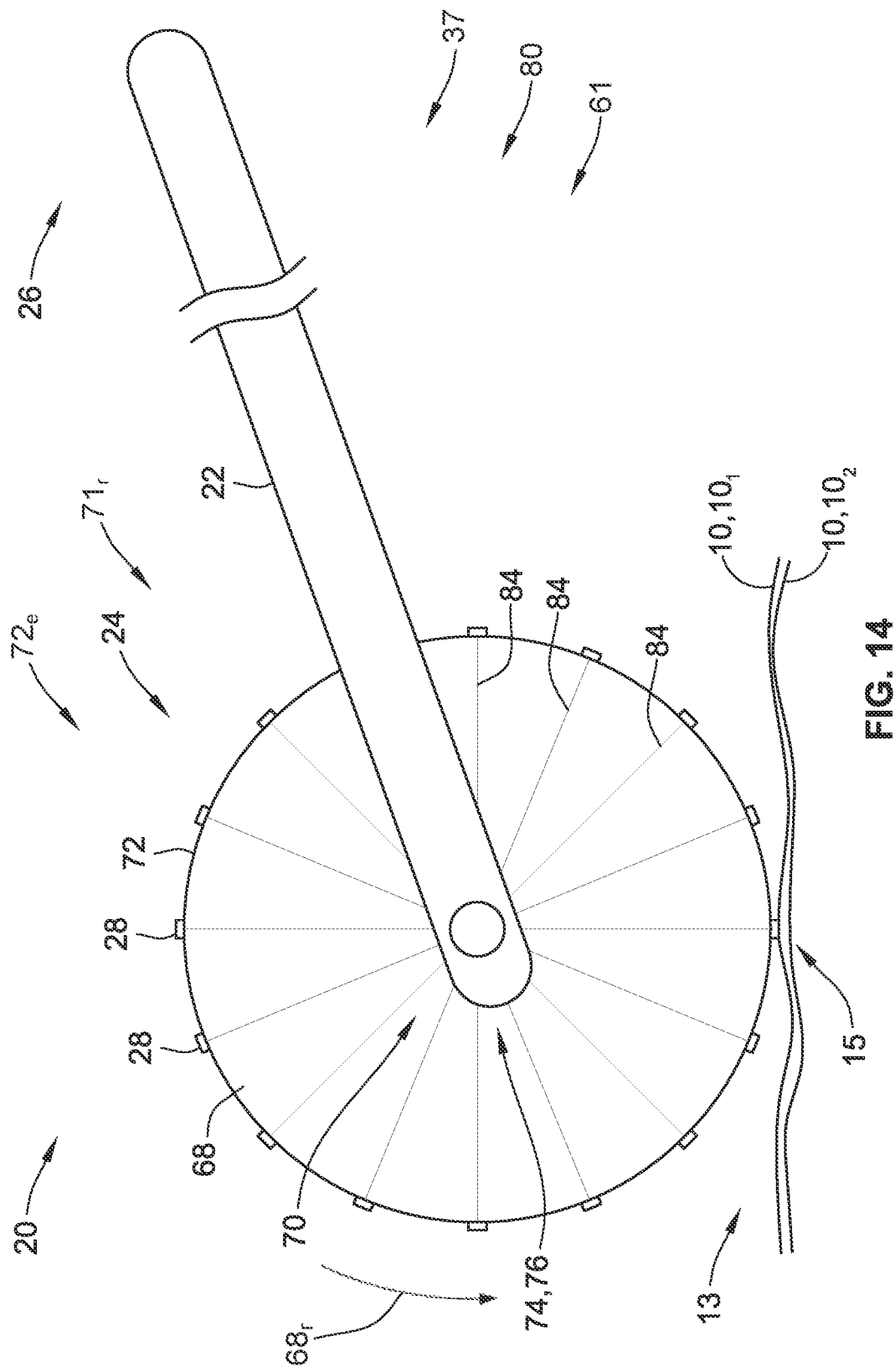
FIG. 14 is a schematic side of a tacking device configured as a "pizza cutter".
Figure 15:
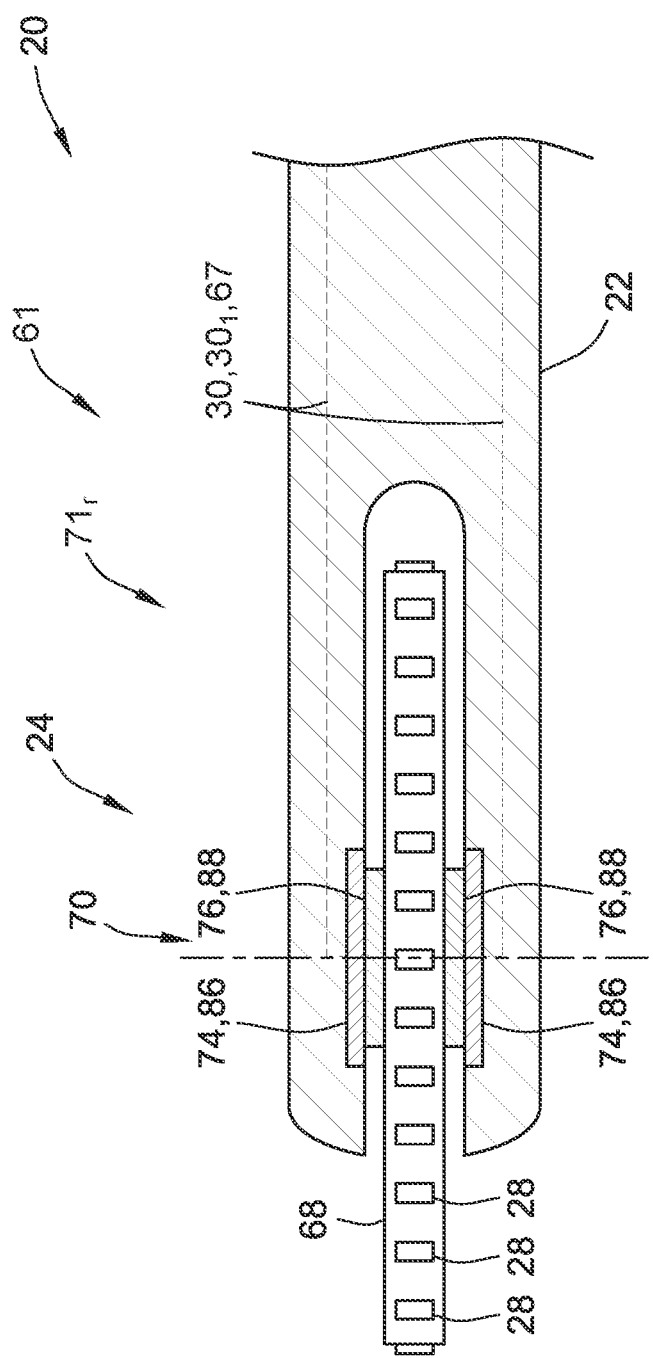
FIG. 15 is a schematic top partial sectional view of the tacking device of FIG. 14.

Moving now to FIGS. 14-15, respective side and top views are shown of a "pizza cutter" type of configuration for the tacking device 20. As shown in the drawings, the body portion 22 may have a roller 68 at the first body portion end 24. The roller 68 may have a hub 70 that is rotatably attached 71, to the first body portion end 24, with the one or more micro-heaters 28 being attached 71 along an outer perimeter 72 of the roller 68. Thus, in this configuration, a user U may hold H or grasp the tacking device 20 at the second body portion end 26 (see also FIG. 23), and then may press the roller 68 against selected portions 15 (e.g., selected discrete lengths) of the overlapped or abutted area 13, 14. If the one or more micro-heaters 28 are not already electrified and heated-up 78 prior to the user U pressing 150 the roller 68 against the overlapped or abutted area 13, 14, then in some arrangements (as described below) the pressing action may actuate the switch 54, which in turn may cause electric power 99 to flow to all or selected ones $28_s$ of the micro-heaters 28, thereby heating them.

This configuration may further include a first electrical distribution member 74 disposed on the body portion 22 at the first body portion end 24, and a second electrical distribution member 76 disposed on the roller 68 about the hub 70. The first electrical distribution member 74 may be in electrical communication 61 with the switch 54 and the second electrical distribution member 76 may be in electrical communication 61 with the one or more micro-heaters 28, with the first and second electrical distribution members 74, 76 being configured to maintain electrical communication 61 with each other while the roller 68 is rolled $68_r$ about the hub 70. In some arrangements, the one or more micro-heaters 28 may be evenly spaced 80 around an entirety $72_e$ of the outer perimeter 72 or outer circumference of the roller 68, the first electrical distribution member 74 may include a first slip ring member 86, and the second electrical distribution member 76 may include a second slip ring member 88 in electrical communication 61 with the first slip ring member 86. In this configuration, as the roller 68 is pressed 150 against and rolled $68_r$ along the overlapped or abutted area 13, 14, the heated micro-heaters 28' may melt 81 or activate 82 the respective veils 12 made of thermoplastic or thermoset material $12_{TP}$, $12_{TS}$ at the points of rolling contact, thus forming corresponding tacked portions 16 along the path of rolling contact. (Note that as used herein, reference numeral 28 without an accent mark denotes the one or more micro-heaters 28 (which may not be currently electrified or heated necessarily), whereas reference numeral 28' with an accent mark denotes one or more electrified and heated micro-heaters 28'.)

FIGS. 16-17 show schematic side views of a "pizza cutter" configuration of tacking device 20 being held at two different angles θ. More specifically, FIG. 16 shows the tacking device 20 being held at a first angle $θ_1$ formed between the longitudinal axis 21 and the direction that is normal to the two overlapped or abutted layers $10_o$, $10_a$, whereas FIG. 17 shows the tacking device 20 being held at a second angle $θ_2$ that is smaller than the first angle $θ_1$. Both drawings show twenty-four micro-heaters 28 evenly spaced 80 about the outer perimeter 72 of the roller 68, but any number of micro-heaters 28 may be utilized. Note that in both drawings, the longitudinal axis 21 of the body portion 22 is shown extending to a particular one of the micro-heaters 28, which is designated in both of the drawings as a first micro-heater $28_1$. Moving counter-clockwise around the outer perimeter 72 of the roller 68, the drawings also show micro-heaters designated as second, third and fourth micro-heaters $28_2$, $28_3$, $28_4$. Because of the difference between the first and second angles $θ_1$, $θ_2$, the tacking device 20 makes contact with the two layers 10 at the third micro-heater $28_3$ in FIG. 16 and at the fourth micro-heater $28_4$ in FIG. 17, with the external pressing force 94 being exerted upward against the third and fourth micro-heaters $28_3$, $28_4$, respectively. This external pressing force 94 is in turn exerted upward against the roller 68 and the hub 70.

Although the switch 54 is not shown in FIGS. 16-17 (due to the body portion 22 obscuring the switch 54), the switch 54 is shown in the block diagrams of FIGS. 18-19, which show various mechanical and electrical interactions, respectively, among selected elements of the "pizza cutter" configuration.

In the mechanical block diagram of FIG. 18, the external pressing force 94 is shown acting against the roller 68 and the hub 70, with the hub 70 in turn mechanically interacting with (e.g., pressing against) the switch 54. The drawing also shows that the hub 70 may also mechanically interact with (e.g., press against) a biasing member 46 in parallel with the switch 54. (Note, however, that serial or serial-parallel mechanical interaction may also or instead occur.) Here, the drawing also indicates that an auto-shutoff circuit 62 (described in detail below) may be included as part of or in association with the switch 54.

In the electrical block diagram of FIG. 19, the switch 54 is illustrated as receiving electric power 99 (e.g., from an internal battery 38, an external electric power source 34, etc.) and then providing the electric power 99 to the first electrical distribution member 74 (which may be a first slip ring member 86), with the first electrical distribution member 74 passing the electric power 99 on to the second electrical distribution member 76 (which may be a second slip ring member 86). The second electrical distribution member 76 then passes the electric power 99 on to the one or more micro-heaters 28 (illustrated here as including up to an $n^{th}$ micro-heater $28_n$). The switch 54 may also be in communication with a device controller 64 and/or an interface 66, both of which are described in more detail below.

In any of the foregoing configurations of the tacking device 20, the switch 54 may be configured to permit 51 or prevent 53 the flow $99_f$ of electric power 99 to the one or more micro-heaters 28 by an external pressing force 94 being applied $94_a$ against the first body portion end 24 so as to actuate the switch 54.

For example, if the tacking device 20 is presented in a "tacking wand" configuration having an elongate tip portion 40 (e.g., see FIGS. 12-13), then the external pressing force 94 may be applied $94_a$ against the distal tip end 42 when the tacking device 20 (and specifically the distal tip end 42) is pressed 150 against the overlapped or abutted area 13, 14. As a result of this pressing action, the external pressing force 94 acting against the distal tip end 42 may cause the elongate tip portion 40 to push against the biasing member 46 to move from the fully extended position 50 to the fully retracted position 52, thus causing some part of the elongate tip portion 40 (such as the proximal tip end 44) to actuate or toggle the switch 54. In this situation, the switch 54 may be a latching type, which may be toggled between ON and OFF states by actuation $55_a$ of the switch 54. Alternatively, the switch 54 may be configured as a momentary switch $54_M$, so as to permit 51 the flow $99_f$ of electric power 99 to the one or more micro-heaters 28 only when an external pressing force 94 is being applied $94_a$ against the distal tip end 42; that is, the one or more micro-heaters 28 are heated-up 78 only when an external pressing force 94 is being applied $94_a$ against the distal tip end 42 (e.g., when the user U is pressing the distal tip end 42 against the overlapped or abutted area 13, 14).

Alternatively, if the tacking device 20 is presented in a "pizza cutter" configuration (e.g., see FIGS. 14-19), then the external pressing force 94 may be applied $94_a$ against the roller 68 when the tacking device 20 (and specifically the roller 68) is pressed 150 against the overlapped or abutted area 13, 14. As a result of this pressing action, the external pressing force 94 acting against the roller 68 may cause the hub 70 to push against the switch 54, so as to thereby actuate the switch 54. In this situation, the switch 54 may be a momentary switch $54_M$, which permits 51 a flow $99_f$ of electric power 99 to the one or more micro-heaters 28 only when an external pressing force 94 is pressing against the roller 68, the hub 70 and the switch 54.

As mentioned above, the tacking device 20 may also include an auto-shutoff circuit 62 operatively connected with one or more of the switch 54, the biasing member 46, the elongate tip portion 40 and the one or more micro-heaters 28. The auto-shutoff circuit 62 may be configured to shut off 190 the flow of electric power 99 to the one or more micro-heaters 28 when the micro-heaters 28 are powered on $99_{po}$ and no external pressing force 94 has been applied $94_a$ against the distal tip end 42 for more than a predetermined time-out period 85. For example, as illustrated in FIG. 18, the auto-shutoff circuit 62 may be included as part of or in association with the switch 54, and the predetermined time-out period 85 may be 30 seconds, two minutes, ten minutes, or any desired time period, including a user-adjustable time period.

As also mentioned above, the tacking device 20 may further include a device controller 64 operatively connected with one or more of the switch 54, the first electrical distribution member 74, the second electrical distribution member 76 and the one or more micro-heaters 28. The device controller 64 may be configured for selectively permitting $51_s$ the flow $99_f$ of electric power 99 to selected ones $28_s$ of the micro-heaters 28. As shown in FIG. 19, the switch 54 and/or the auto-shutoff circuit 62 may send a signal 91 to the device controller 64, wherein the signal 91 indicates which one or more of the micro-heaters 28 are in contact with the two layers 10. This signal 91 may be generated by a sensor (not shown) which detects which micro-heater(s) 28 the external pressing force 94 is pressing against. For example, the sensor may be a circumferential sensor encircling the hub 70, such that the sensor is configured to sense which part of the hub 70 is pressing most against the circumferential sensor, thus indicating the direction that the external pressing force 94 is acting (and which micro-heater(s) 28 the external pressing force 94 is pushing against). The device controller 64 may then send a command 98 to the switch 54 with instructions for which micro-heater(s) 28 to energize and heat up 78. For example, the command 98 may indicate to the switch 54 to energize the micro-heater(s) 28 that is/are currently being pressed against, as well as the next two micro-heaters 28 that are situated clockwise from the micro-heater(s) 28 currently being pressed against. Thus, following this example, in FIG. 16 the first, second and third micro-heaters $28_1$, $28_2$, $28_3$ would be energized, whereas in FIG. 17 the second, third and fourth micro-heaters $28_2$, $28_3$, $28_4$ would be energized. Additionally, the sensor may also be configured to detect the clockwise or counter-clockwise direction in which the roller 68 is being rotated, thereby facilitating the "pizza cutter" tacking device 20 to be used for rotation in either direction.

Optionally, the tacking device 20 may also include an interface 66 operatively connected with one or more of the switch 54, the first electrical distribution member 74, the second electrical distribution member 76 and the one or more micro-heaters 28. Such an interface 66 may be configured for receiving commands 98 from an external controller 97 for selectively permitting $51_s$ the flow $99_f$ of electric power 99 to selected ones $28_s$ of the micro-heaters 28. For example, the external controller 97 may be part of a robot 92 to which the tacking device 20 is attached 71; in this arrangement, the commands 98 may be viewed as originating from the robot 92, rather than from the aforementioned sensor.

Figure 20:
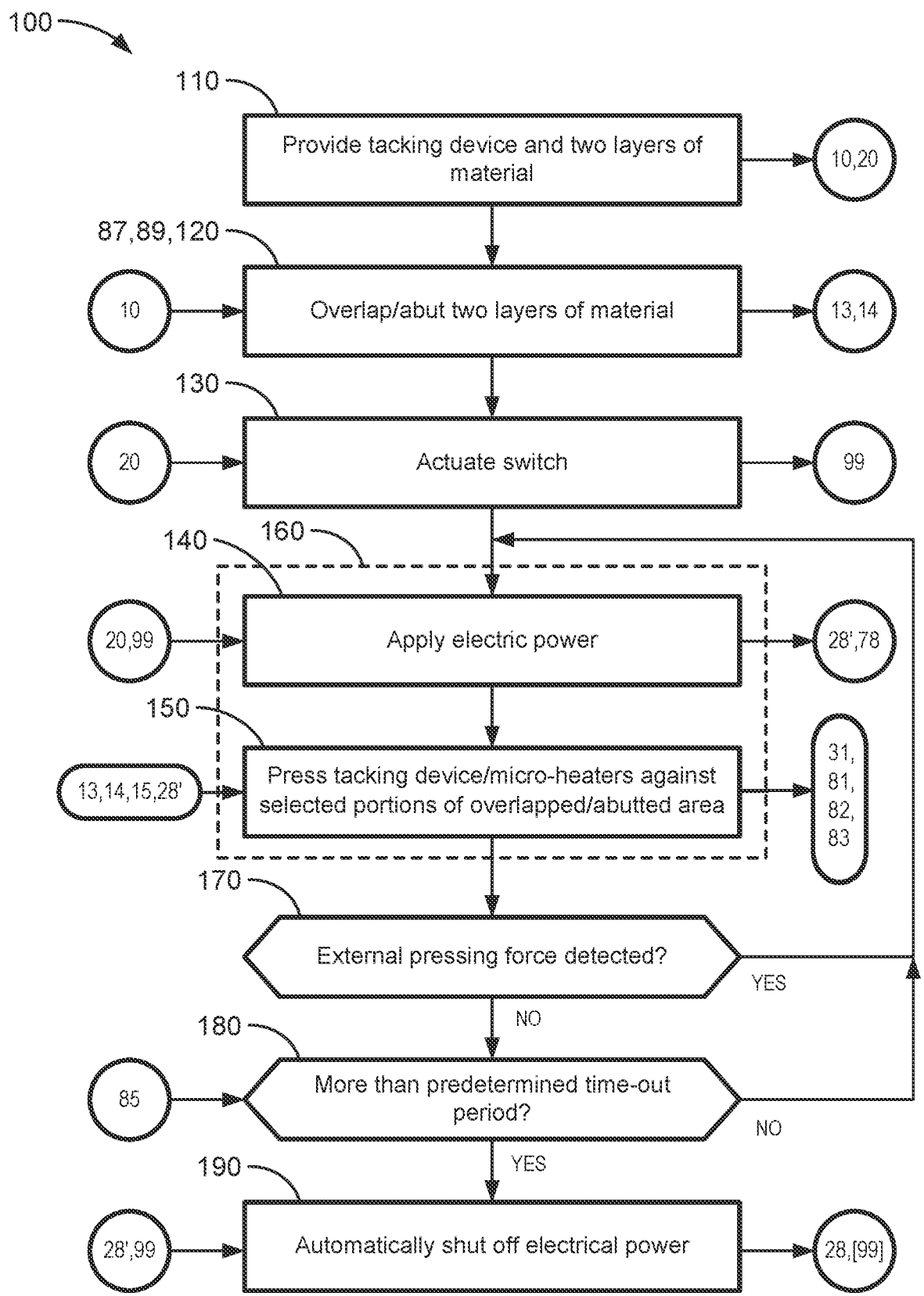
FIG. 20 is a flowchart for a method for tacking together two layers of material.

FIG. 20 shows a flowchart for a method 100 for tacking together 31 two layers 10 of material. Note that the ingredients or "inputs" are shown to the left of each block or step, and the results or "outputs" are shown to the right of each block or step. The method 100 may include some or all of the steps represented by blocks 110 through 190.

At block 110, a tacking device 20 and two layers 10 of material (e.g., first and second layers $10_1$, $10_2$) may be provided. Here, the tacking device 20 has a body portion 22 with a first body portion end 24 and one or more micro-heaters 28 attached 71 to the body portion 22 at the first body portion end 24; additionally, each of the two layers 10 may have a respective veil 12 made of a thermoplastic material $12_{TP}$ or a thermoset material $12_{TS}$. (The tacking device 20 may also optionally include a switch 54 that is in electrical communication 61 with the one or more micro-heaters 28, an elongate tip portion 40 at the first body portion end 24, and/or other features and structures described above in connection with the tacking device 20.)

At block 120, the two layers 10 of material may be overlapped 87 or abutted 89 with each other, thereby providing a respective overlapped or abutted area 13, 14. The two layers 10 may be positioned on a work area 18 so as to form the overlapped area 13 or the abutted area 14. Optionally, one or more overlapped areas 13 may be formed along with one or more abutted areas 14.

At block 130, a switch 54 that is in electrical communication 61 with the one or more micro-heaters 28 may be actuated, such that the switch actuation $55_a$ permits 51 or prevents 53 a flow $99_f$ of the electric power 99 to the one or more micro-heaters 28.

At block 140, electric power 99 is applied to the tacking device 20, such that the applied electric power 99 causes the one or more micro-heaters 28 to heat up 78, thereby providing one or more heated-up micro-heaters 28'.

At block 150, the tacking device 20 may be pressed against the overlapped or abutted area 13, 14 with the one or more heated-up micro-heaters 28' pressed against one or more selected portions 15 of the overlapped or abutted area 13, 14, thereby producing one or more corresponding tacked portions 16 of the overlapped or abutted layers $10_o$, $10_a$. This pressing of the one or more heated-up micro-heaters 28' against the one or more selected portions 15 may cause the respective veils 12 to either melt 81 and fuse together 83 (if the layers 10 have veils 12 made of a thermoplastic material $12_{TP}$), or to activate 82 and fuse together 83 (if the layers 10 have veils 12 made of a thermoset material $12_{TS}$), at the one or more selected portions 15, so as to produce the one or more corresponding tacked portions 16 thereat.

At block 160, the one or more micro-heaters 28 (e.g., one or more heated-up micro-heaters 28') may be used to melt 81 or activate 82 the respective veils made of thermoplastic or thermoset material $12_{TP}$, $12_{TS}$ at the overlapped or abutted area 13, 14 so as to tack 31 the two layers 10 together. In some arrangements, blocks 140 and 150 may be combined together to form block 160; this is denoted in FIG. 20 by the dashed rectangle surrounding blocks 140 and 150.

At block 170, a determination is made as to whether an external pressing force 94 is being applied $94_a$ against the first body portion end 24. In some configurations in which the tacking device 20 includes a switch 54 carried inside the body portion 22 and the first body portion end 24 includes an elongate tip portion 40 with a distal tip end 42, the application of an external pressing force 94 against the distal tip end 42 may cause the elongate tip portion 40 to actuate the switch 54. If an external pressing force 94 is detected (Y), then the process flow routes back to a point immediately before block 140; however, if no external pressing force 94 is detected (N), then the process flow continues on to block 180.

At block 180, a determination is made as to whether no external pressing force 94 has been detected for more than a predetermined time-out period 85. If no external pressing force 94 has been detected for less than or equal to the predetermined time-out period 85 (N), then the process flow routes back to a point immediately before block 140; however, if no external pressing force 94 has been detected for more than the predetermined time-out period 85 (Y), then the process flow continues on to block 190.

Finally, at block 190, the flow of the electric power 99 to the one or more micro-heaters 28 may be automatically shut off. (That is, the one or more electrified and heated-up micro-heaters 28' become one or more micro-heaters 28 that are non-electrified and non-heated.) This occurs when the one or more micro-heaters 28 are powered on $99_{po}$ but no external pressing force 94 has been applied $94_a$ against the one or more micro-heaters 28 for more than the predetermined time-out period 85. The step of automatically shutting off the electric power 99 may be performed using the auto-shutoff circuit 62. Note in FIG. 20 and as used elsewhere herein that reference numeral 99 denotes the flow $99_f$ of electric power 99, while reference numeral enclosed in brackets denotes a lack or cessation of flow $99_f$ of electric power 99.

Figure 21:
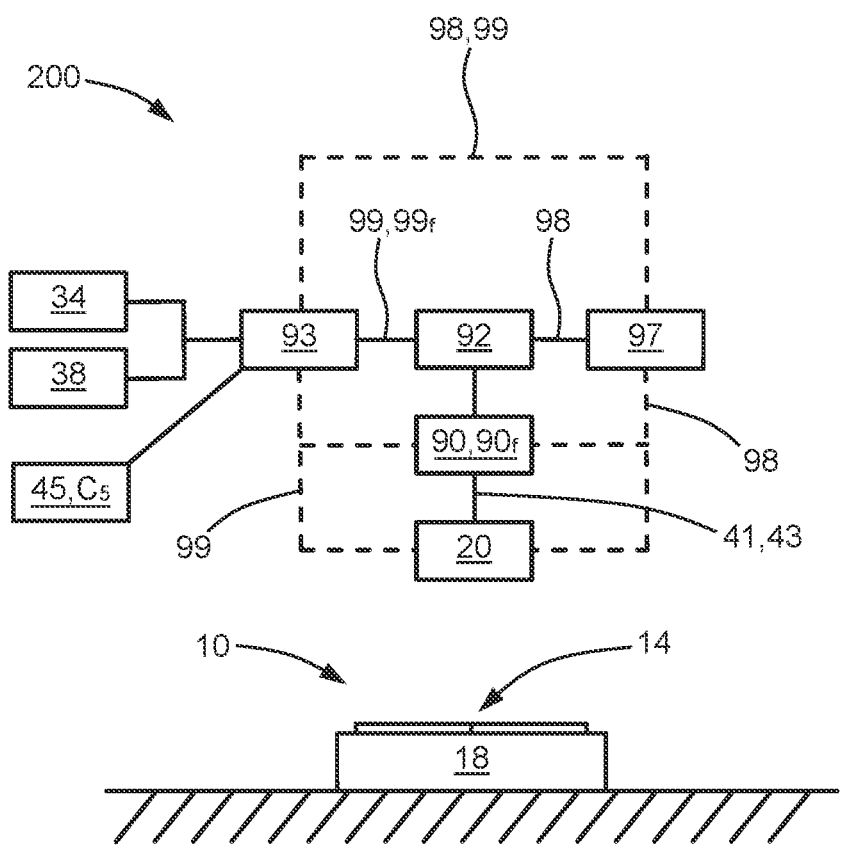
FIG. 21 is a block diagram of a system for tacking together two layers of material.

FIG. 21 shows a block diagram is shown of a system 200 for tacking together 31 two layers 10 of material 19. The system 200 includes: (i) a tacking device 20 having a body portion 22 with a first body portion end 24, one or more micro-heaters 28 attached 71 to the body portion 22 at the first body portion end 24, and a switch 54 in electrical communication 61 with the one or more micro-heaters 28 and configured to permit 51 or prevent 53 a flow $99_f$ of electric power 99 to the one or more micro-heaters 28; (ii) a power supply 93 for supplying the electric power 99 to the tacking device 20 to heat up 78 the one or more micro-heaters 28, thereby providing one or more heated-up micro-heaters 28'; and (iii) a work area 18 on which the two layers 10 of material 19 may be overlapped 87 or abutted 89 with each other and tacked together 31 by pressing 150 the one or more heated-up micro-heaters 28' against the two overlapped or abutted layers $10_o$, $10_a$.

The system 200 may further include an end effector 90 configured for attachment 41 with and movement 43 of the tacking device 20, wherein the end effector 90 may be a robotic end effector $90_r$ that is part of a robot 92, such as an industrial robot. The robot 92 may include or may be connected with an external controller 97, which is configured for executing control instructions and for sending and/or receiving commands 98 to and/or from the robot 92. The power supply 93 may provide electric power 99 to one or more of the robot 92, the end effector 90, the external controller 97 and the tacking device 20, and the external controller 97 may send and/or receive commands 98 (e.g., control signals) to and/or from one or more of the robot 92, the end effector 90, the power supply 93 and the tacking device 20. Note that the word "external" is used here to describe the "external controller" 97, where the word "external" indicates that the external controller 97 is "external" to the tacking device 20 (wherein the external controller 97 may or may not be "external" to the robot 92). Note that the power supply 93 may be internal to the tacking device 20 (e.g., an internal battery 38) or it may be external to the tacking device 20 (e.g., an external electric power source 34).

Returning to FIG. 3, a block diagram is shown of exemplary components and materials of which each layer 10 may be constructed. As shown here, and as further elucidated by FIGS. 1 and 2, a layer 10 may include a fiber core 11 covered by at least one veil 12, which together form the material 19 of which the layer 10 is made. The fiber core 11 may be made of a multiplicity of fibers or strands, which may be woven together (e.g., in the form of a cloth or textile) or which may take the form of a mat of chopped fiber or strands. The fibers or strands of the fiber core 11 may be made of one or more of carbon $11_c$ (e.g., carbon fiber), polymer $11_p$ (e.g., polyester, polyamide, polyethylene terephthalate, aramid, acrylic), glass $11_g$ (e.g., fiberglass), metal $11_m$ (e.g., stainless steel, nickel, aluminum, titanium, copper) and ceramic $11_k$ (e.g., silica, alumina, basalt). The veil 12 may be made of a thermoplastic material $12_{TP}$ (which may be melted by the application of heat and then allowed to return to solid form by cooling) or a thermoset material $12_{TS}$ (which may be chemically activated and cured by the application of heat). For example, each layer 10 may have a fiber core 11 made of one of the abovementioned materials, with a veil 12 made of thermoplastic material $12_{TP}$ or thermoset material $12_{TS}$ covering the top and/or bottom surfaces of the fiber core 11.

As one having skill in the relevant art will appreciate, the tacking device 20, system 200 and method 100 of the present disclosure may be presented or arranged in a variety of different configurations and embodiments.

According to one embodiment, a tacking device 20 for tacking together 31 two overlapped or abutted layers $10_o$, $10_a$ of material 19 includes a body portion 22 having a first body portion end 24, one or more micro-heaters 28 attached 71 to the body portion 22 at the first body portion end 24, and a switch 54 in electrical communication 61 with the one or more micro-heaters 28 and configured to permit 51 or prevent 53 a flow $99_f$ of electric power 99 to the one or more micro-heaters 28.

The body portion 22 may be configured to be hand-held 37 and may have a generally tubular shape 75. The tacking device 20 may also include a coating 56 disposed on an exterior surface 58 of the first body portion end 24, wherein the coating 56 is configured for resisting $57_r$ a build-up 57 of material 59 thereon. Each of the one or more micro-heaters 28 may have a power consumption 45 of less than 5 Watts $C_5$. The switch 54 may be configured as a momentary switch $54_M$, and optionally the switch 54 may be configured to permit 51 the flow $99_f$ of electric power 99 to the one or more micro-heaters 28 only when an external pressing force 94 is being applied $94_a$ against the first body portion end 24.

The tacking device 20 may be configured for being inductively charged $96_{ic}$ and/or inductively powered $96_{ip}$ by an inductive power source 96. The body portion 22 may have an internal cavity 36 and a battery 38 disposed within 67 the internal cavity 36, wherein the battery 38 is in electrical communication 61 with the one or more micro-heaters 28 via the switch 54.

The tacking device 20 may further include a first electrical lead 30 providing electrical communication 61 between the switch 54 and the one or more micro-heaters 28, and a second electrical lead 32 providing electrical communication 61 between the switch 54 and a two-pronged electrical connector 39 that is disposed outside 63 and separate 65 from the body portion 22. In this arrangement, the switch 54 may be attached 71 to and/or captured 73 within 67 the body portion 22, wherein a first segment $32_1$ of the second electrical lead 32 extends within 67 the body portion 22 and a second segment $32_2$ of the second electrical lead 32 extends outside 63 the body portion 22. Here, the second electrical lead 32 may extend outside 63 the body portion 22.

Alternatively, the switch 54 may be disposed outside 63 and separate 65 from the body portion 22. In this configuration, a primary segment $30_1$ of the first electrical lead 30 may extend within 67 the body portion 22 and a secondary segment $30_2$ of the first electrical lead 30 may extend outside 63 the body portion 22.

The first body portion end 24 may include an elongate tip portion 40, wherein the elongate tip portion 40 has a distal tip end 42 and wherein the one or more micro-heaters 28 is/are attached 71 to the distal tip end 42. At least one of the body portion 22 and the elongate tip portion 40 may be made of a thermally insulative material 79.

The elongate tip portion 40 may have a proximal tip end 44 opposed to the distal tip end 42 and disposed within 67 the body portion 22, with the elongate tip portion 40 being at least partially retractable 77 into the body portion 22. In this arrangement, the tacking device 20 may further include a biasing member 46 captured 73 within 67 the body portion 22. The biasing member 46 may have a first biasing member end 47 attached 71 to the elongate tip portion 40 and a second biasing member end 48 attached 71 to an internal part 49 of the body portion 22, wherein the biasing member 46 cooperates $46_c$ with the elongate tip portion 40 and the body portion 22 such that the elongate tip portion 40 is moveable $40_m$ between: (i) a fully extended position 50, in which no external pressing force 94 is being applied $94_a$ against the distal tip end 42 and the elongate tip portion 40 extends to a maximum length $L_{max}$ out from the first body portion end 24; and (ii) a fully retracted position 52, in which an external pressing force 94 is being applied $94_a$ against the distal tip end 42 and the elongate tip portion 40 extends to a minimum length $L_{min}$ out from the first body portion end 24.

The elongate tip portion 40 may be continuously moveable $40_{cm}$ between the fully extended position 50 and the fully retracted position 52, thereby permitting a user U holding H the tacking device 20 with the one or more micro-heaters 28 against the two overlapped or abutted layers $10_o$, $10_a$ of material 19 to control $94_c$ the external pressing force 94 being applied $94_a$ against the one or more micro-heaters 28. The switch 54 may be configured to permit 51 or prevent 53 the flow $99_f$ of electric power 99 to the one or more micro-heaters 28 by an external pressing force 94 being applied $94_a$ against the distal tip end 42 to thereby cause the elongate tip portion 40 to actuate 130 the switch 54. Additionally, the switch 54 may be actuatable 55 to permit 51 or prevent 53 the flow $99_f$ of electric power 99 to the one or more micro-heaters 28 when the elongate tip portion 40 is moved $40_{md}$ to the fully retracted position 52 by the external pressing force 94. Further, the switch 54 may be configured to permit 51 the flow $99_f$ of electric power 99 to the one or more micro-heaters 28 only when an external pressing force 94 is being applied $94_a$ against the distal tip end 42.

The tacking device 20 may also include an auto-shutoff circuit 62 operatively connected with one or more of the switch 54, the biasing member 46, the elongate tip portion 40 and the one or more micro-heaters 28, wherein the auto-shutoff circuit 62 is configured to shut off 190 the flow of electric power 99 to the one or more micro-heaters 28 when the one or more micro-heaters 28 are powered on $99_{po}$ and no external pressing force 94 has been applied $94_a$ against the distal tip end 42 for more than a predetermined time-out period 85.

The tacking device 20 may further include a device controller 64 operatively connected with the switch 54 and/or the one or more micro-heaters 28, wherein the device controller 64 is configured for selectively permitting $51_s$ the flow $99_f$ of electric power 99 to selected ones $28_s$ of the micro-heaters 28. The tacking device 20 may additionally include an interface 66 operatively connected with the switch 54 and/or the one or more micro-heaters 28, wherein the interface 66 is configured for receiving commands 98 from an external controller 97 for selectively permitting $51_s$ the flow $99_f$ of electric power 99 to selected ones $28_s$ of the micro-heaters 28.

The body portion 22 may include a roller 68 having a hub 70 that is rotatably attached $71_r$ to the first body portion end 24, wherein the one or more micro-heaters 28 are attached 71 about an outer perimeter 72 of the roller 68. In this configuration, the tacking device 20 may further include a first electrical distribution member 74 disposed on the body portion 22 at the first body portion end 24 and a second electrical distribution member 76 disposed on the roller 68 about the hub 70, wherein the first electrical distribution member 74 is in electrical communication 61 with the switch 54 and the second electrical distribution member 76 is in electrical communication 61 with the one or more micro-heaters 28, and wherein the first and second electrical distribution members 74, 76 are configured to maintain electrical communication 61 with each other while the roller 68 is rolled $68_r$ about the hub 70. The one or more micro-heaters 28 may be evenly spaced 80 around an entirety $72_e$ of the outer perimeter 72, and the first electrical distribution member 74 may include a first slip ring member 86 and the second electrical distribution member 76 may include a second slip ring member 88 in electrical communication 61 with the first slip ring member 86.

The tacking device 20 may further include a device controller 64 operatively connected with one or more of the switch 54, the first electrical distribution member 74, the second electrical distribution member 76 and the one or more micro-heaters 28, wherein the device controller 64 is configured for selectively permitting $51_s$ the flow $99_f$ of electric power 99 to selected ones $28_s$ of the micro-heaters 28. The tacking device 20 may also include an interface 66 operatively connected with one or more of the switch 54, the first electrical distribution member 74, the second electrical distribution member 76 and the one or more micro-heaters 28, wherein the interface 66 is configured for receiving commands 98 from an external controller 97 for selectively permitting $51_s$ the flow $99_f$ of electric power 99 to selected ones $28_s$ of the micro-heaters 28. Additionally, the switch 54 may be configured to permit 51 the flow $99_f$ of electric power 99 to the one or more micro-heaters 28 only when an external pressing force 94 is being applied $94_a$ against the roller 68.

In any of the foregoing configurations of the tacking device 20, the material 19 may have a fiber core 11 covered by at least one veil 12, wherein the fiber core 11 may be made of at least one of carbon $11_c$, polymer $11_p$, glass $11_g$, metal $11_m$ and ceramic $11_k$, and wherein the at least one veil 12 may be made of a thermoplastic material $12_{TP}$ or a thermoset material $12_{TS}$.

According to another embodiment, a method 100 for tacking together 31 two layers 10 of material 19 includes: (i) at block 120, overlapping 87 or abutting 89 the two layers 10 of material 19, thereby providing an overlapped or abutted area 13, 14; (ii) at block 140, applying electric power 99 to a tacking device 20, wherein the tacking device 20 has a body portion 22 with a first body portion end 24 and one or more micro-heaters 28 attached 71 to the body portion 22 at the first body portion end 24, wherein the applied electric power 99 causes the one or more micro-heaters 28 to heat up 78, thereby providing one or more heated-up micro-heaters 28'; and (iii) at block 150, pressing the tacking device 20 against the overlapped or abutted area 13, 14 with the one or more heated-up micro-heaters 28' pressed against one or more selected portions 15 of the overlapped or abutted area 13, 14, thereby producing one or more corresponding tacked portions 16 of the overlapped or abutted layers $10_o$, $10_a$.

The method 100 may also include, at block 130, actuating a switch 54 that is in electrical communication 61 with the one or more micro-heaters 28, thereby permitting 51 or preventing 53 a flow $99_f$ of the electric power 99 to the one or more micro-heaters 28. The method 100 may further include, at block 190, automatically shutting off the flow $99_f$ of the electric power 99 to the one or more micro-heaters 28 when the one or more micro-heaters 28 are powered on $99_{po}$ and no external pressing force 94 has been applied $94_a$ against the one or more micro-heaters 28 for more than a predetermined time-out period 85.

In this method 100, each of the two layers 10 of material 19 may include a respective veil 12 made of a thermoplastic material $12_{TP}$, and wherein the pressing 150 of the one or more heated-up micro-heaters 28' against the one or more selected portions 15 of the overlapped or abutted area 13, 14 causes the respective veils 12 to melt 81 and fuse together 83 at the one or more selected portions 15 so as to produce the one or more corresponding tacked portions 16 thereat. Additionally or alternatively, each of the two layers 10 of material 19 may include a respective veil 12 made of a thermoset material $12_{TS}$, and wherein the pressing of the one or more heated-up micro-heaters 28' against the one or more selected portions 15 of the overlapped or abutted area 13, 14 causes the respective veils 12 to activate 82 and fuse together 83 at the one or more selected portions 15 so as to produce the one or more corresponding tacked portions 16 thereat.

According to yet another embodiment, a method 100 for tacking together 31 two layers 10 of material 19 is provided, wherein each of the two layers 10 has a respective veil 12 made of a thermoplastic material $12_{TP}$ or a thermoset material $12_{TS}$. The method 100 includes, at block 120, overlapping 87 or abutting 89 the two layers 10 of material 19, thereby providing an overlapped or abutted area 13, 14, and, at block 160, using one or more micro-heaters 28 to melt 81 or activate 82 the respective veils 12 at the overlapped or abutted area 13, 14, so as to tack 31 the two layers 10 together.

According to a further embodiment, a system 200 for tacking together 31 two layers 10 of material 19 includes: (i) a tacking device 20 having a body portion 22 with a first body portion end 24, one or more micro-heaters 28 attached 71 to the body portion 22 at the first body portion end 24, and a switch 54 in electrical communication 61 with the one or more micro-heaters 28 and configured to permit 51 or prevent 53 a flow $99_f$ of electric power 99 to the one or more micro-heaters 28; (ii) a power supply 93 for supplying the electric power 99 to the tacking device 20 to heat up 78 the one or more micro-heaters 28, thereby providing one or more heated-up micro-heaters 28'; and (iii) a work area 18 on which the two layers 10 of material may be overlapped 87 or abutted 89 with each other and tacked together 31 by pressing 150 the one or more heated-up micro-heaters 28' against the two overlapped or abutted layers $10_o$, $10_a$.

The system 200 may further include an end effector 90 configured for attachment 41 to and movement 43 of the tacking device 20, wherein the end effector 90 may be a robotic end effector $90_r$.

While various steps of the method 100 have been described as being separate blocks, and various functions of the tacking device 20 and system 200 have been described as being separate modules or elements, it may be noted that two or more steps may be combined into fewer blocks, and two or more functions may be combined into fewer modules or elements. Similarly, some steps described as a single block may be separated into two or more blocks, and some functions described as a single module or element may be separated into two or more modules or elements. Additionally, the order of the steps or blocks described herein may be rearranged in one or more different orders, and the arrangement of the functions, modules and elements may be rearranged into one or more different arrangements.

(As used herein, a "module" may include hardware and/or software, including executable instructions, for receiving one or more inputs, processing the one or more inputs, and providing one or more corresponding outputs. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.)

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A tacking device for tacking together two overlapped or abutted layers of material, comprising:
   a body portion having a first body portion end;
   an elongated tip extending from the first body portion end and comprising a distal tip end;
   one or more micro-heaters attached to the elongated tip and disposed on an exterior surface of the distal tip end; and
   a switch in electrical communication with the one or more micro-heaters and configured to permit or prevent a flow of electric power to the one or more micro-heaters.

2. The tacking device of claim 1, wherein the body portion is configured to be hand-held.

3. The tacking device of claim 1, wherein each of the one or more micro-heaters has a power consumption of less than 5 Watts.

4. The tacking device of claim 1, wherein the body portion has a generally tubular shape.

5. The tacking device of claim 1, further comprising:
   a coating disposed on an exterior surface of the first body portion end, wherein the coating is configured for resisting a build-up of material thereon.

6. The tacking device of claim 1, wherein the tacking device is configured for being inductively charged and/or inductively powered by an inductive power source.

7. The tacking device of claim 1, wherein the body portion has an internal cavity and a battery disposed within the internal cavity, wherein the battery is in electrical communication with the one or more micro-heaters via the switch.

8. The tacking device of claim 1, further comprising:
   a first electrical lead providing electrical communication between the switch and the one or more micro-heaters; and a second electrical lead providing electrical communication between the switch and a two-pronged electrical connector that is disposed outside and separate from the body portion.

9. The tacking device of claim 8, wherein the switch is attached to and/or captured within the body portion.

10. The tacking device of claim 9, wherein a first segment of the second electrical lead extends within the body portion and a second segment of the second electrical lead extends outside the body portion.

11. The tacking device of claim 9, wherein the second electrical lead extends outside the body portion.

12. The tacking device of claim 8, wherein the switch is disposed outside and separate from the body portion.

13. The tacking device of claim 12, wherein a primary segment of the first electrical lead extends within the body portion and a secondary segment of the first electrical lead extends outside the body portion.

14. The tacking device of claim 1, wherein at least one of the body portion and the elongate tip portion is made of a thermally insulative material.

15. The tacking device of claim 1, wherein the elongate tip portion has a proximal tip end opposed to the distal tip end and disposed within the body portion, with the elongate tip portion being at least partially retractable into the body portion, the tacking device further comprising:
a biasing member captured within the body portion, the biasing member having a first biasing member end attached to the elongate tip portion and a second biasing member end attached to an internal part of the body portion, wherein the biasing member cooperates with the elongate tip portion and the body portion such that the elongate tip portion is moveable between:
a fully extended position, in which no external pressing force is being applied against the distal tip end and the elongate tip portion extends to a maximum length out from the first body portion end; and
a fully retracted position, in which an external pressing force is being applied against the distal tip end and the elongate tip portion extends to a minimum length out from the first body portion end.

16. The tacking device of claim 15, wherein the elongate tip portion is continuously moveable between the fully extended position and the fully retracted position, thereby permitting a user holding the tacking device with the one or more micro-heaters against the two overlapped or abutted layers of material to control the external pressing force being applied against the one or more micro-heaters.

17. The tacking device of claim 15, wherein the switch is configured to permit or prevent the flow of electric power to the one or more micro-heaters by an external pressing force being applied against the distal tip end to thereby cause the elongate tip portion to actuate the switch.

18. The tacking device of claim 15, wherein the switch is configured to permit the flow of electric power to the one or more micro-heaters only when an external pressing force is being applied against the distal tip end.

19. The tacking device of claim 1, wherein the switch is configured to permit the flow of electric power to the one or more micro-heaters only when an external pressing force is being applied against the first body portion end.

20. The tacking device of claim 17, wherein the switch is actuatable to permit or prevent the flow of electric power to the one or more micro-heaters when the elongate tip portion is moved to the fully retracted position by the external pressing force.

21. The tacking device of claim 1, wherein the switch is configured as a momentary switch.

22. The tacking device of claim 15, further comprising:
an auto-shutoff circuit operatively connected with one or more of the switch, the biasing member, the elongate tip portion and the one or more micro-heaters, wherein the auto-shutoff circuit is configured to shut off the flow of electric power to the one or more micro-heaters when the one or more micro-heaters are powered on and no external pressing force has been applied against the distal tip end for more than a predetermined time-out period.

23. The tacking device of claim 1, further comprising:
a device controller operatively connected with the switch and/or the one or more micro-heaters, wherein the device controller is configured for selectively permitting the flow of electric power to selected ones of the micro-heaters.

24. The tacking device of claim 1, further comprising:
an interface operatively connected with the switch and/or the one or more micro-heaters, wherein the interface is configured for receiving commands from an external controller for selectively permitting the flow of electric power to selected ones of the micro-heaters.

25. A tacking device for tacking together two overlapped or abutted layers of material, comprising:
a body portion having a first body portion end;
a roller having a hub that is rotatably attached to the first body portion end;
one or more micro-heaters attached about an outer perimeter of the roller; and
a switch in electrical communication with the one or more micro-heaters and configured to permit or prevent a flow of electric power to the one or more micro-heaters.

26. The tacking device of claim 25, further comprising:
a first electrical distribution member disposed on the body portion at the first body portion end and a second electrical distribution member disposed on the roller about the hub, wherein the first electrical distribution member is in electrical communication with the switch and the second electrical distribution member is in electrical communication with the one or more micro-heaters, and wherein the first and second electrical distribution members are configured to maintain electrical communication with each other while the roller is rolled about the hub.

27. The tacking device of claim 25, wherein the one or more micro-heaters are evenly spaced around an entirety of the outer perimeter.

28. The tacking device of claim 26, wherein the first electrical distribution member includes a first slip ring member and the second electrical distribution member includes a second slip ring member in electrical communication with the first slip ring member.

29. The tacking device of claim 26, further comprising:
a device controller operatively connected with one or more of the switch, the first electrical distribution member, the second electrical distribution member and the one or more micro-heaters, wherein the device controller is configured for selectively permitting the flow of electric power to selected ones of the micro-heaters.

30. The tacking device of claim 26, further comprising:
an interface operatively connected with one or more of the switch, the first electrical distribution member, the second electrical distribution member and the one or more micro-heaters, wherein the interface is configured for receiving commands from an external controller for selectively permitting the flow of electric power to selected ones of the micro-heaters.

31. The tacking device of claim 25, wherein the switch is configured to permit the flow of electric power to the one or more micro-heaters only when an external pressing force is being applied against the roller.

32. The tacking device of claim 1, wherein the material has a fiber core covered by at least one veil, wherein the fiber core is made of at least one of carbon, polymer, glass, metal and ceramic, and wherein the at least one veil is made of a thermoplastic material or a thermoset material.

33. A method for tacking together two layers of material, comprising:
   overlapping or abutting the two layers of material, thereby providing an overlapped or abutted area;
   applying electric power to a tacking device, wherein the tacking device comprises:
      a body portion with a first body portion end;
      one of an elongated tip extending from the first body portion end and comprising a distal tip end or a roller having a hub that is rotatably attached to the first body portion end;
      one or more micro-heaters attached to one of the elongated tip and disposed on an exterior surface of the distal tip end or about an outer perimeter of the roller, wherein the applied electric power causes the one or more micro-heaters to heat up, thereby providing one or more heated-up micro-heaters; and
   pressing the tacking device against the overlapped or abutted area with the one or more heated-up micro-heaters pressed against one or more selected portions of the overlapped or abutted area, thereby producing one or more corresponding tacked portions of the overlapped or abutted layers.

34. The method of claim 33, further comprising:
   actuating a switch that is in electrical communication with the one or more micro-heaters, thereby permitting or preventing a flow of the electric power to the one or more micro-heaters.

35. The method of claim 34, further comprising:
   automatically shutting off the flow of the electric power to the one or more micro-heaters when the one or more micro-heaters are powered on and no external pressing force has been applied against the one or more micro-heaters for more than a predetermined time-out period.

36. The method of claim 33, wherein each of the two layers of material includes a respective veil made of a thermoplastic material, and wherein the pressing of the one or more heated-up micro-heaters against the one or more selected portions of the overlapped or abutted area causes the respective veils to melt and fuse together at the one or more selected portions so as to produce the one or more corresponding tacked portions thereat.

37. The method of claim 33, wherein each of the two layers of material includes a respective veil made of a thermoset material, and wherein the pressing of the one or more heated-up micro-heaters against the one or more selected portions of the overlapped or abutted area causes the respective veils to activate and fuse together at the one or more selected portions so as to produce the one or more corresponding tacked portions thereat.

38. A system for tacking together two layers of material, comprising:
   a tacking device comprising:
      a body portion with a first body portion end;
      one of an elongated tip extending from the first body portion end and comprising a distal tip end or a roller having a hub that is rotatably attached to the first body portion end;
      one or more micro-heaters attached to one of the elongated tip and disposed on an exterior surface of the distal tip end or about an outer perimeter of the roller; and
      a switch in electrical communication with the one or more micro-heaters and configured to permit or prevent a flow of electric power to the one or more micro-heaters;
   a power supply for supplying the electric power to the tacking device to heat up the one or more micro-heaters, thereby providing one or more heated-up micro-heaters; and
   a work space on which the two layers of material may be overlapped or abutted with each other and tacked together by pressing the one or more heated-up micro-heaters against the two overlapped or abutted layers.

39. The system of claim 38, further comprising:
   an end effector configured for attachment to and movement of the tacking device.

40. The system of claim 39, wherein the end effector is a robotic end effector.

41. The system of claim 1, further comprising cooling fins disposed at the first body portion end of the body portion.

42. The system of claim 25, further comprising a biasing member coupled to the hub in parallel with the switch.

* * * * *